(12) United States Patent
Van Der Velde et al.

(10) Patent No.: US 11,895,552 B2
(45) Date of Patent: *Feb. 6, 2024

(54) RESOURCE ARRANGEMENT

(71) Applicant: Samsung Electronics Co., Ltd., Suwon-si (KR)

(72) Inventors: Himke Van Der Velde, Zwolle (NL); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,646

(22) Filed: Jun. 23, 2022

(65) Prior Publication Data

US 2022/0330127 A1 Oct. 13, 2022

Related U.S. Application Data

(63) Continuation of application No. 15/652,904, filed on Jul. 18, 2017, now Pat. No. 11,445,424.

(30) Foreign Application Priority Data

Jul. 18, 2016 (GB) .................................. 1612391
Sep. 30, 2016 (GB) .................................. 1616646

(51) Int. Cl.
*H04W 36/30* (2009.01)
*H04W 72/542* (2023.01)
(Continued)

(52) U.S. Cl.
CPC ..... *H04W 36/305* (2018.08); *H04W 36/0072* (2013.01); *H04W 72/02* (2013.01);
(Continued)

(58) Field of Classification Search
None
See application file for complete search history.

(56) References Cited

U.S. PATENT DOCUMENTS 10,149,338 B2 * 12/2018 Basu Mallick ... H04W 72/0446
10,512,062 B2   12/2019 Lee et al.
(Continued)

FOREIGN PATENT DOCUMENTS

CN    106470485 A    3/2017
EP      3453214 A    3/2019
(Continued)

OTHER PUBLICATIONS

ZTE, Considerations on Mobility Enhancements for V2V, 3GPP TSG-RAN WG2 Meeting #94, May 23-27, 2016, R2-163820, Nanjing, China.
(Continued)

*Primary Examiner* — Jeffrey M Rutkowski
*Assistant Examiner* — Luna Weissberger
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for switching resource pools by a device arranged to transmit according to a first resource pool is provided. The method includes sensing a second resource pool, determining whether the second resource pool has been sensed sufficiently long to apply sensing based (Continued)

resource selection, and selecting resources from an exceptional pool by using random resource selection, if the second resource pool has not been sensed sufficiently long to apply sensing based resource selection.

16 Claims, 19 Drawing Sheets

(51) Int. Cl.
  *H04W 36/00* (2009.01)
  *H04W 72/02* (2009.01)
  *H04W 72/0446* (2023.01)
  *H04W 74/02* (2009.01)
  *H04W 72/23* (2023.01)
(52) U.S. Cl.
  CPC ......... *H04W 72/542* (2023.01); *H04W 74/02* (2013.01); *H04W 72/0446* (2013.01); *H04W 72/23* (2023.01)

(56) References Cited

U.S. PATENT DOCUMENTS

| | | | |
|---|---|---|---|
| 10,531,353 | B2 | 1/2020 | Baghel et al. |
| 10,743,154 | B2 | 8/2020 | Xu et al. |
| 10,827,502 | B2* | 11/2020 | Basu Mallick ....... H04W 72/51 |
| 11,044,646 | B2 | 6/2021 | Uemura et al. |
| 2013/0157676 | A1 | 6/2013 | Baek et al. |
| 2013/0308551 | A1 | 11/2013 | Madan et al. |
| 2013/0322413 | A1 | 12/2013 | Pelletier et al. |
| 2014/0133593 | A1 | 5/2014 | Lim et al. |
| 2014/0198655 | A1 | 7/2014 | Ishii et al. |
| 2015/0156806 | A1 | 6/2015 | Pan |
| 2016/0080920 | A1 | 3/2016 | Baghel et al. |
| 2016/0192254 | A1* | 6/2016 | Hooli ................ H04W 36/0069 370/331 |
| 2016/0269887 | A1 | 9/2016 | Kim et al. |
| 2016/0270053 | A1 | 9/2016 | Zeng et al. |
| 2016/0270083 | A1 | 9/2016 | Zeng et al. |
| 2016/0302249 | A1 | 10/2016 | Sheng |
| 2016/0323780 | A1 | 11/2016 | Bhanage |
| 2017/0164249 | A1* | 6/2017 | Uemura ............ H04W 36/0072 |
| 2017/0230918 | A1 | 8/2017 | Ryu et al. |
| 2017/0303240 | A1* | 10/2017 | Basu Mallick ....... H04W 72/02 |
| 2018/0020387 | A1 | 1/2018 | Vandervelde et al. |

FOREIGN PATENT DOCUMENTS

| | | |
|---|---|---|
| GB | 2552554 A | 1/2018 |
| WO | 2013-177179 A1 | 11/2013 |
| WO | 2015/101843 A1 | 7/2015 |
| WO | 2015/170871 A1 | 11/2015 |
| WO | 2016/013538 A1 | 1/2016 |
| WO | 2016/018009 A1 | 2/2016 |
| WO | 2016-039870 A1 | 3/2016 |
| WO | 2016/045094 A1 | 3/2016 |
| WO | 2018/016836 A1 | 1/2018 |

OTHER PUBLICATIONS

NTT DOCOMO, Discussion on Details of Sensing with Semi-Persistent Transmission, 3GPP TSG RAN WG1 Meeting #84bis, Apr. 11-15, 2016, R1-163176, Busan, Korea.
LG Electronics Inc., 'Geo-Information Based Resource Allocation', 3GPP TSG-RAN2 Meeting #94, May 23-27, 2016, R2-164216, Nanjing, China.
Samsung, 'Mitigation of Mobility Interruption for Resource Allocation', 3GPP TSG RAN WG2 Meeting #94, Apr. 23-25, 2016, R2-163452, Nanjing, China.
International Search Report dated Oct. 25, 2017, issued in the International Application No. PCT/KR2017/007687 dated Jul. 18, 2017.
Samsung, Sensing related interruption for UE autonomous resource selection, 3GPP TSG-RAN WG2 Meeting #95, R2-165042, Aug. 22-26, 2016, Gothenburg, Sweden.
GB Office Action dated Dec. 1, 2016, issued in GB Application No. GB1612391.1.
GB Office Action dated Mar. 14, 2017, issued in GB Application No. GB1616646.4.
Great Britain Office Action dated Jun. 19, 2019, issued in a counterpart GB application No. GB1616646.4.
Great Britain Office Action dated Nov. 1, 2019, issued in a counterpart GB application No. GB1612391.1.
Korean Office Action dated Jan. 13, 2022, issued in a counterpart Korean Application No. 10-2019-7001658.
NTT DOCOMO, Inc .; Transmitter UE behaviour for sensing-based resource allocation; 3GPP TSG RAN WG1 Meeting #85; R1-165192, May 14, 2016, Nanjing, China.
Intel Corporation; Discussion on Resource Reselection Triggers for V2V Communication; 3GPP TSG RAN WG1 Meeting #85; R1-164138; May 14, 2016, Nanjing, China.
3GPP TS 36.331 V13.2.0; 3rd Generation Partnership Project; Technical Specification Group Radio Access Network; Evolved Universal Terrestrial Radio Access (E-UTRA); Radio Resource Control (RRC); 2016.
Chinese Office Action dated Apr. 12, 2023, issued in Chinese Patent Application No. 201780044479.0.
Chinese Notice of Allowance dated Jul. 7, 2023, issued in Chinese Patent Application No. 201780044479.0.
Indian Notice of Hearing dated Nov. 28, 2023, issued in Indian Patent Application No. 201937001539.

* cited by examiner

FIG. 16

```
SystemInformationBlockType18-r12 ::= SEQUENCE {
    commConfig-r12                    SEQUENCE {
161 ──── commRxPool-r12                    SL-CommRxPoolList-r12,
162 ──── commTxPoolNormalCommon-r12        SL-CommTxPoolList-r12
        OPTIONAL, -- Need OR
163 ──── commTxPoolExceptional-r12         SL-CommTxPoolList-r12
        OPTIONAL, -- Need OR
        commSyncConfig-r12                 SL-SyncConfigList-r12
        OPTIONAL -- Need OR
    }                                                              OPTIONAL, --
Need OR
    lateNonCriticalExtension           OCTET STRING
    OPTIONAL,
    ...,
                                      164
    [[ commTxPoolNormalCommonExt-r13        SL-CommTxPoolListExt-r13
    OPTIONAL, -- Need OR
        commTxResourceUC-ReqAllowed-r13     ENUMERATED {true}
    OPTIONAL, -- Need OR
        ommTxAllowRelayCommon-r13           ENUMERATED {true}
    OPTIONAL -- Need OR              165
    ]],
    [[ neighCellTxInfoList-r14              SL-CommNeighCellInfoList
    r14  OPTIONAL, -- Need OR
        neighCellCommTxPoolSame-r14         ENUMERATED {true}
    OPTIONAL -- Need OR
    ]],
}
                                      166
```

FIG. 17A

```
RRCConnectionReconfiguration-v1250-IEs ::= SEQUENCE {
    wlan-OffloadInfo-r12           CHOICE {
        release                        NULL,
        setup                          SEQUENCE {
            wlan-OffloadConfigDedicated-r12    WLAN-OffloadConfig-r12,
            t350-r12                           ENUMERATED {min5, min10,
min20, min30, min60,
                                                   min120, min180, spare1}
            OPTIONAL -- Need OR
        }
    }                                                              OPTIONAL, --
Need ON
    scg-Configuration-r12          SCG-Configuration-r12    OPTIONAL,
    -- Cond nonFullConfig
    sl-SyncTxControl-r12           SL-SyncTxControl-r12
OPTIONAL, -- Need ON
    sl-DiscConfig-r12              SL-DiscConfig-r12
    OPTIONAL, -- Need ON
171 ─ sl-CommConfig-r12             SL-CommConfig-r12
    OPTIONAL, -- Need ON
    nonCriticalExtension           RRCConnectionReconfiguration
v1310- IEs OPTIONAL
}

SL-CommConfig-r12 ::=                  SEQUENCE {
    commTxResources-r12                    CHOICE {
        release                                NULL,
        setup                              CHOICE {
            scheduled-r12                      SEQUENCE {
                sl-RNTI-r12                        C-RNTI,
                mac-MainConfig-r12                 MAC-MainConfigSL-r12,
                sc-CommTxConfig-r12                    SL-CommResourcePool-r12,
                mcs-r12                            INTEGER (0..28)
    OPTIONAL -- Need OP
            },
            ue-Selected-r12                    SEQUENCE {
                -- Pool for normal usage
                commTxPoolNormalDedicated-r12 SEQUENCE {
                    poolToReleaseList-r12          SL-TxPoolToReleaseList-
r12 OPTIONAL, -- Need ON
                    poolToAddModList-r12           SL-
CommTxPoolToAddModList- r12 OPTIONAL    -- Need ON
                }
            }
        }
    }
```

FIG. 17B

```
                                          OPTIONAL, --Need
ON
    ...,
    [[ commTxResources-v1310              CHOICE {
         release                          NULL,
         setup                            CHOICE {
            scheduled-v1310               SEQUENCE {
               logicalChGroupInfoList-r13
LogicalChGroupInfoList-r13,
               multipleTx-r13             BOOLEAN
            },
            ue-Selected-v1310             SEQUENCE {
               commTxPoolNormalDedicatedExt-r13    SEQUENCE {
                  poolToReleaseListExt-r13         SL-
TxPoolToReleaseListExt-r13 OPTIONAL,--Need ON
                  poolToAddModListExt-r13          SL-
CommTxPoolToAddModListExt-r13OPTIONAL --Need ON
               }
            }
         }
      }                                   OPTIONAL, --Need
ON
      commTxAllowRelayDedicated-r13  BOOLEAN    OPTIONAL --
Need ON                                                         172
    ]],                                                        /
    [[ neighCellTxInfoList-r14            SL-CommNeighCellInfoList-
r14 OPTIONAL, --Need OR
      neighCellCommTxPoolSame-r14         ENUMERATED {true}
    OPTIONAL --Need OR
    ]]
                                                               /
}                                                             173
```

RESOURCE ARRANGEMENT

CROSS-REFERENCE TO RELATED APPLICATION(S)

This application is a continuation application of prior application Ser. No. 15/652,904, filed on Jul. 18, 2017, which is based on and claimed the benefit under 35 U.S.C. § 119(a) of a United Kingdom patent application number 1612391.1, filed on Jul. 18, 2016, in the United Kingdom Patent Office, and of a United Kingdom patent application number 1616646.4, filed on Sep. 30, 2016, in the United Kingdom Patent Office, the disclosure of each of which is incorporated by reference herein in its entirety.

TECHNICAL FIELD

The present disclosure relates to resource arrangement or configuration for devices and to methods and apparatuses for arranging resources. More particularly, the present disclosure relates to switching resource pools for devices.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Long term evolution (LTE) has been proposed for safety critical communications for safety critical systems, including group communications and proximity based services. The proximity based services may be provided when devices, such as user equipment (UE), are relatively proximal. The proximity based services may include: ProSe Direct Discovery, in which two devices are identified as relatively proximal; ProSe Direct Communication, in which two devices communicate directly using reserved LTE resources; and Network-level Discovery and Network Support for WLAN Direct Discovery and Communication.

ProSe Direct Communication may also be known as device-to-device (D2D) communication. D2D communication may be provided for vehicle-to-everything (V2X) communication, which may involve a vehicle as a source or a destination of a message, for example. V2X communication may include, for example, vehicle-to-vehicle (V2V) communication, vehicle-to-infrastructure (V2I) communication, for example road infrastructure, vehicle-to-network (V2N) communication, for example the Internet and vehicle-to-pedestrian (V2P) communication.

D2D communication requires resources for communication, for example bandwidth for transmission. However, devices may contend for the same resources and/or use the same resources. Interference, for example due to data collisions, between communicating D2D devices may reduce a quality of service (QoS). Retransmission of the data may be required though this may further increase interference. Furthermore, safety critical systems may be compromised by data lost as a result of the data collisions or by data delayed as a result of retransmission of the data. In addition, devices may transition between cells and/or geographic zones within a cell, for example due to movement of a vehicle. Such transitions may require that the devices switch from the resources to other resources, for example due to use of the same resources by other devices. However, such transitions may not be predictable and/or may be out-of-coverage, requiring autonomous resource configuration by the devices. In addition, such transitions may be associated with latencies that may result in interruption of transmission, which may also compromise safety critical systems.

Hence, there is a need to improve resource arrangements for devices, particularly with respect to autonomous resource arrangement. In this way, for example, latency and/or interruption of transmission may be reduced or avoided. In this way, for example, the QoS may be improved. In this way, for example, compromise of safety critical systems may be lowered or averted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide switching resource pools for devices which at least partially obviates or mitigates at least some of the disadvantages of the prior art, whether identified herein or elsewhere. For example, the present disclosure may provide for switching resource pools for devices, in which latency and/or interruption of transmission may be reduced or avoided. In this way, a quality of service (QoS) may be improved such that, for example, compromise of safety critical systems may be lowered or averted.

In accordance with an aspect of the present disclosure, a method of switching resource pools by a device, is provided. The method includes transmitting according to a first resource pool, sensing a second resource pool, switching from the first resource pool to the second resource pool, based on a result of the sensing the second resource pool, and transmitting according to the second resource pool.

In accordance with another aspect of the present disclosure, a method of switching from the first resource pool to the second resource pool is provided. The method includes determining if the second resource pool has been sensed longer than an amount of time to apply sensing based resource selection, and based on a result of the determining, using sensing based resource selection if the second resource pool has been sensed for longer than an amount of time to apply the sensing based resource selection, and using random resource selection for the second resource pool if the second resource pool has not been sensed for longer than an amount of time to apply the sensing based resource selection.

If the switching from the first resource pool to the second resource pool comprises using the random resource selection for the second resource pool, the method may comprise changing, for the second resource pool, from using the random resource selection to using the sensing based resource selection based on the result of the sensing the second resource pool.

The method may comprise receiving information related to the second resource pool.

The sensing of the second resource pool may comprise sensing the second resource pool according to the received information related to the second resource pool.

The method may comprise determining an expected cell change, and starting the sensing of the second resource pool based on the determining the expected cell change.

The method may comprise determining a cell change, and wherein the switching from the first resource pool to the second resource pool is based on the result of the sensing of the second resource pool and the determining of the cell change.

The method may comprise determining an expected zone change, and starting the sensing of the second resource pool based on the determining of the expected zone change.

The method may comprise determining a zone change, and wherein the switching from the first resource pool to the second resource pool is based on the result of the sensing of the second resource pool and the determining of the zone change.

The method may comprise receiving a command, and starting the sensing of the second resource pool based on the received command, and wherein the switching from the first resource pool to the second resource pool is based on the result of the sensing of the second resource pool and the command.

The method may comprise determining a state transition of the device, starting the sensing of the second resource pool based on the determining of the state transition, and wherein the switching from the first resource pool to the second resource pool is based on the result of the sensing of the second resource pool and the determining of the state transition.

The method may comprise sensing a third resource pool, switching from the second resource pool to the third resource pool, based on a result of the sensing the third resource pool, and transmitting according to the third resource pool.

The sensing may be performed according to scheduling assignment (SA), decoding.

The sensing may be performed according to an energy measurement.

The method may comprise pre-sensing a reception resource pool.

The method may comprise receiving a bit indicating that the first resource pool continues across a cell border.

The method may comprise pre-sensing the second resource pool based on at least one of a time to trigger (TTT) or a treselection timer.

In accordance with another aspect of the present disclosure, a device comprising a transmitter and a receiver is provided. The device is arranged to transmit according to a first resource pool, sense a second resource pool, switch from the first resource pool to the second resource pool, based on a result of the sensing the second resource pool, and transmit according to the second resource pool.

The device may be arranged to switch from the first resource pool to the second resource pool by determining if the second resource pool has been sensed for longer than an amount of time to apply sensing based resource selection, and based on a result of the determining, using sensing based resource selection if the second resource pool has been sensed for longer than an amount of time to apply the sensing based resource selection, and using random resource selection for the second resource pool if the second resource pool has not been sensed for longer than an amount of time to apply the sensing based resource selection.

If the switch from the first resource pool to the second resource pool comprises using random resource selection for the second resource pool, the device may be configured to change, for the second resource pool, from using the random resource selection to using the sensing based resource selection based on the result of the sensing the second resource pool.

The device may be configured to receive information related to the second resource pool.

The device may be configured to sense the second resource pool according to the received information related to the second resource pool.

The device may be configured to determine an expected cell change, and start the sensing of the second resource pool based on the determined expected cell change. The device may be configured to determine a cell change, and switch from the first resource pool to the second resource pool based on the result of the sensing of the second resource pool and the determined cell change.

The device may be configured to determine an expected zone change, and start the sensing of the second resource pool based on the determined expected zone change.

The device may be configured to determine a zone change, and switch from the first resource pool to the second resource pool based on the result of the sensing of the second resource pool and the determined zone change.

The device may be configured to receive a command, start sensing the second resource pool based on the received command, and switch from the first resource pool to the second resource pool based on the result of the sensing of the second resource pool and the command.

The device may be configured to determine a state transition of the device, start sensing the second resource pool based on the determined state change, and switch from the first resource pool to the second resource pool based on the result of the sensing of the second resource pool and the determined state transition.

The device may be configured to sense a third resource pool, switch from the second resource pool to the third resource pool, based on a result of the sensing the third resource pool, and transmit according to the third resource pool.

The device may be configured to sense according to SA decoding.

The device may be configured to sense according to an energy measurement.

The device may be configured to pre-sense a reception resource pool.

The device may be configured to receive a bit indicating that the first resource pool continues across a cell border.

The device may be configured to pre-sense the second resource pool based on at least one of a TTT or a Treselection timer.

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or embodiment of the present disclosure, as set out herein are also applicable to all other aspects or various embodiments of the present disclosure, where appropriate. In other words, the skilled person reading this specification should consider the optional features for each aspect or embodiment of the present disclosure as interchangeable and combinable between different aspects and various embodiments.

In accordance with another aspect of the present disclosure a method of switching resource pools is provided. The method implemented by a device, wherein the device is arranged to transmit according to a first resource pool, the method comprising sensing a second resource pool, and switching from the first resource pool to the second resource pool, based on a result of the sensing the second resource pool, wherein the device is arranged to transmit according to the second resource pool.

In this way, the device may, for example, transmit data according to, for example via or using, the first resource pool. In parallel, simultaneously, concurrently or interleavingly to transmitting the data, the device may also sense the second resource pool. Based on a result of the sensing, the device may switch, for example directly, indirectly, conditionally, subsequently, autonomously or in response to a request, to the second resource pool. By switching, for example reconfiguring, changing, swapping, exchanging, migrating or moving, from the first resource pool to the second resource pool, the device may be arranged to transmit according to, for example via or using, the second resource pool. In other words, by switching, the device may start transmitting according to the second resource pool. In addition, by switching, the device is arranged to not transmit according to, for example via or using, the first resource pool. In other words, by switching, the device stops transmitting according to the first resource pool. That is, the device may be arranged to transmit according to only one resource pool, for example the first resource pool or the second resource pool. In this way, the device may, for example, transmit data according to the arranged, for example newly-arranged, second resource pool.

Switching from the first resource pool to the second resource pool may comprise determining if the second resource pool has been sensed sufficiently long to apply sensing based resource selection; and based on a result of the determining using sensing based resource selection if the second resource pool has been sensed sufficiently long to apply sensing based resource selection; and using random resource selection for the second resource pool if the second resource pool has not been sensed sufficiently long to apply sensing based resource selection.

If switching from the first resource pool to the second resource pool comprises using random resource selection for the second resource pool, the method may comprise: changing, for the second resource pool, from using random resource selection to using sensing based resource selection based on a result of the sensing the second resource pool.

For example, if the device has not performed sufficient sensing of the second resource pool, as described below, the device may switch initially from the first resource pool to the second resource pool, using random resource selection of the second resource pool. Subsequently, when the device has performed sufficient sensing of the second resource pool, the device may change, for the second resource pool, from using random resource selection to using sensing based resource selection based on a result of the sensing the second resource pool.

In other words, if the device does not manage to complete sensing of the second resource pool (for example, a temporary or fallback or exceptional resource pool) for long enough, the device temporarily uses the second resource pool with random selection. The second resource pool may be broadcast. Random selection may initially, when the device was unable to perform sensing for long enough prior to switching to the second resource pool (i.e., sufficient pre-sensing), for example upon zone change, connection establishment, radio link failure (RLF) and/or connection re-establishment. The second resource pool may also be used upon cell re-selection and/or moving out of coverage, with sensing based resource selection if possible and with random selection otherwise.

Upon moving out of coverage, the device may sense, for example pre-sense, similarly as when moving to another zone, i.e., a zone change. The device may sense, for example pre-sense, one or more candidate resource pools, for example a set of multiple potential candidates and may change the set depending on movement of the device, for example. The second resource pool (for example, a temporary or fallback or exceptional resource pool) may be pre-configured, for example as part of SL-V2X-Preconfiguration.

By sensing the second resource pool while transmitting according to the first resource pool and switching from the first resource pool to the second resource pool after sensing the second resource pool, latency and/or interruption of transmission arising from sensing, for example, may be reduced or avoided according to the related art. In this way, a QoS may be improved such that, for example, compromise of safety critical systems may be lowered or averted.

Generally, in communication in a network, for example over an Uu interface, a node for example an enhanced node B (eNB) may communicate with a device via a downlink (DL) and/or an uplink (UL) according to the related art. For D2D communication, two devices may communicate via a sidelink (SL). The SL may correspond, for example, to a PC5 interface. Resources for the SL may be from the UL. For example, resources for the SL may be from subframes on a UL frequency in frequency division duplex (FDD) or from subframes assigned to the UL in time division duplex (TDD).

Two SL logical channels may be defined for D2D communication: a SL traffic channel (STCH) and a SL broadcast control channel (SBCCH). The STCH may be used for data transmission and may be connected with a SL shared channel (SL-SCH). The STCH may interface with a physical SL shared channel (PSSCH), which may transport data wirelessly. The SBCCH may be used for synchronization in out-of-coverage and/or partial coverage situations, as described below, and/or synchronization between devices located in different cells. The STCH may be connected with a SL broadcast channel (SL-BCH) which may interface with a physical SL broadcast channel (PSBCH). A Physical SL Control Channel may be equivalent to a physical downlink control channel (PDCCH) in communication according to related art. The PDCCH contains sidelink control information (SCI), which carries information that devices require to receive and demodulate the PSSCH.

A resource pool (RP) may be a set of resources assigned to the SL. The RP may comprise subframes and resource blocks within the subframes. A subframe bitmap may indicate whether a subframe may be used by the SL. Within a usable subframe, resources used by the SL may be arranged in two frequency bands or physical resource block (PRB) bandwidth units, each having a frequency range defined in terms of PRBnum resource blocks. A first band may start at a frequency PRBstart and a second band may end at a frequency PRBend. This arrangement may allow nesting of a plurality of RPs within a subframe, while other resource blocks in the subframe may be used by other devices for cellular traffic. A device may use a subframe in a given carrier for either cellular traffic or for SL.

Hence, the RP may be defined in a frequency domain by the three parameters: PRBnum, PRBstart and PRBend. Additionally and/or alternatively, the RP may be defined in a time domain by a bitmap that indicates subframes used for PSCCH transmission.

Information needed to define the RP, for example the frequency domain parameters and/or the time domain bitmap, may be broadcast by the network, for example by an access point (AP), in a system information block (SIB). The device receives this information and may be arranged or configured to use, for example sense and/or receive and/or transmit, the RP according to this received information.

There may be two types of RPs: reception resource pools (Rx RPs) and transmission resource pools (Tx RPs).

D2D communication may handle resource configuration for in-coverage, out-of-coverage and/or partial coverage situations.

In the in-coverage situation, a network may control resources allocated to and/or selected by the devices. For example, in Mode 1 (also known as Scheduled Resource Allocation), the network may allocate a specific resource to a device. The device must be in a connected state, for example in a RRC_CONNECTED state. The allocation of the specific resource to the device may be according to a request from the device. Alternatively, in Mode 2 (also known as Autonomous Resource Selection), the network may allocate a resource pool to the device and the device may select a resource from the allocated resource pool. The device may be in an idle state, for example in a RRC_IDLE state, or may be in the out-of-coverage situation. In this way, interference and/or collisions with transmissions from other devices may be reduced.

In the out-of-coverage situation, control of resources by the network may not be possible. The device may select pre-configured resources, for example.

In the partial coverage situation, coordination between the network and the pre-configured resources may be necessary.

It should be understood that the device may comprise, for example, user equipment (UE). In the universal mobile telecommunications system (UMTS) and 3GPP LTE, UE allows a user to access network services. In other words, a UE is any device used by the user to communicate on a network. The UE may be, for example, a device comprising a transmitter and a receiver or a transceiver, such as a mobile telephone or a laptop computer equipped with a mobile broadband adapter, as described below. The user may be a human user or a non-human user, for example a vehicle or infrastructure. The device may connect to or communicate with or via an AP for example an universal terrestrial radio access network (UTRAN) AP such as a base station Node B (Node B or NB) and/or an evolved base station Node B (eNodeB or eNB), as specified in ETSI 125/136-series and/or 3GPP 25/36-series of specifications. That is, the device may transmit data to and/or receive data from the AP, as described below. Furthermore, the device may connect to or communicate with or via another such device. That is, the device may transmit data to and/or receive data from the AP, as described below. In one example embodiment, the device comprises a UE. In one example embodiment, the device is a UE.

It should be understood that an UTRAN AP may be a conceptual point within the UTRAN performing radio transmission and reception. The UTRAN AP may be associated with one specific cell. That is, there may exist one UTRAN AP for each cell. The UTRAN AP may be the UTRAN-side end point of a radio link.

It should be understood that a cell may be a radio network object that may be uniquely identified by a UE from a cell identification that is broadcast over a geographical area from one UTRAN AP. A cell may be in either frequency division duplex (FDD) or time division duplex (TDD) mode.

It should be understood that an inter-cell handover may be a handover (HO) between different cells. The inter-cell handover may require network connections to be altered.

It should be understood that a sector may be a sub-area of a cell. All sectors within the cell may be served by the same AP. A radio link within the sector may be identified by a single logical identification belonging to the sector.

It should be understood that an intra-cell handover may be a HO within one sector or between different sectors of the same cell.

In an example embodiment, the method comprises determining a cell. For example, the device may determine a current cell, that is, a cell in which the device is currently located. Additionally and/or alternatively, the device may determine an adjacent cell, that is, a cell adjacent to the current cell. For example, if the device is moving in the current cell towards a border of the current cell, the device may determine a target cell, that is, the adjacent cell towards which the device is moving. The device may determine that the border of the current cell will be and/or is being and/or has been crossed. That is, the device may determine a cell change and/or an expected cell change, for example from the current cell to the target cell. The device may for example determine a cell change and/or an expected cell change based on measurement of radio signals. Additionally and/or alternatively, the device may determine a cell change and/or an expected cell change based on receiving a command. In an example embodiment, the method comprises determining a cell change. In an example embodiment, the method comprises determining an expected cell change. In an example embodiment, the method of switching resource pools comprises determining a target cell, as described above. In an example embodiment, the method of switching resource pools comprises sensing the second resource pool, wherein the second resource pool is allocated to the target cell.

It should be understood that the world may be divided into geographical zones. The zones may correspond with cells. Alternatively, the zones may not correspond with the cells. That is, a zone may comprise one or more cells. Additionally and/or alternatively, a cell may comprise one or more zones. For example, a zone may be included wholly within a cell. Additionally and/or alternatively, a zone may extend across one or more cells. For example, a zone may be included partly within a cell and/or partly within an adjacent cell and/or a plurality of adjacent cells.

The zones may be contiguous, that is, borders or boundaries or edges or perimeters of a zone may be common with adjacent or neighboring zones. The zones, for example adjacent zones, may not overlap. That is, a geographical area may be in only one zone. Alternatively, the zones, for example adjacent zones, may overlap. The zones may be of similar shape and/or size, for example the same shape and/or size. Alternatively, the zones may be of different shapes and/or sizes, for example different shapes and/or sizes. The zones may have a regular shape, for example the zones may be quadrilateral such as square or rectangular. However, other shapes may be provided for the zones, for example shapes that may afford tessellation, such as triangular or hexagonal zones. Additionally and/or alternatively, the zones may have other shapes that may not afford tessellation, such as circular or octagonal zones. The sizes and/or locations of the zones may be provided to the device by Aps such as eNBs, for example, for in-coverage situations. Additionally and/or alternatively, the sizes and/or locations of the zones may be pre-configured or stored in and/or for the device, for example, for out-of-coverage situations and/or partial coverage situations. That is, the zones may be configurable for in-coverage, out-of-coverage and/or partial coverage situations. For in-coverage situations, the zones may be configurable for Mode 1 and/or Mode 2 operation. A size of a zone may be defined by a length and a width, for example for a quadrilateral zone. A location of the zone may be defined by an origin, for example, a single fixed reference point such as (0, 0). An identification of the zone, for example a unique identifier of the zone, may be defined. In an example embodiment, the method comprises receives zone information, for example from an access point. That is, the access point may transmit zone information. If zone information is transmitted by the AP, zones may be contiguous across cells if the zone information provided in the cells controlled by the AP is consistent with contiguous zones. That is, zones may not be contiguous. Alternatively, zones may be contiguous if the zone information is consistent with contiguous zones. The zone information may comprise a size and/or location and or identification of a zone. The zone information may comprise sizes and/or locations and/or identifications of a plurality of zones. The device may store the received zone information. In an example embodiment, the method comprises providing with and/or storing zone information during manufacture, initialization, setup, updating, configuration or reconfiguration of the device.

In an example embodiment, the method comprises determining a zone, for example according to a modulo operation. For example, the device may determine a current zone, that is, a zone in which the device is currently located. For example, the device may determine the current zone according to a location, for example a geolocation, of the device and the zone information. The device may determine the location of the device according to, for example, a global positioning system (GPS) location of the device. Additionally and/or alternatively, the device may determine the location of the device according to, for example, radiolocation. The device may transmit the determined location of the device, for example, in Mode 1. The device may transmit the current zone. Additionally and/or alternatively, the device may determine an adjacent zone, that is, a zone adjacent to the current zone. For example, if the device is moving in the current zone towards a border of the current zone, the device may determine a target zone, that is, the adjacent zone towards which the device is moving. The device may determine that the border of the current zone will be and/or is being and/or has been crossed. That is, the device may determine a zone change, for example from the current zone to the target zone.

It should be understood that resource pools may be allocated or assigned to the zones. For example, a transmission resource pool may be allocated to a zone. The transmission resource pool may be allocated to the zone by an AP related to the zone. For example, different transmission resource pools may be allocated to adjacent zones. In this way, inter-zone interference may be reduced. For example, near-far or hearability problems may be avoided. A near-far problem may result if a first transmitting device relatively nearer a receiving device is not aware of a second transmitting device relatively further from the receiving device. So as to reduce interference, the first and the second transmitting devices should transmit according to different resource pools. The first and the second transmitting devices may be allocated different resource pools and/or the first and the second transmitting devices may select different resource pools from allocated resource pools. However, allocating resource pools to zones may restrict, limit or concentrate devices to the same resource pools, thereby increasing a risk of collisions. To avoid this increased risk of collisions, sensing in combination with resource use for a pre-determined time period, for example 0.1 s, 1 s, less than 0.1 s, more than 1 s, may be adopted. Additionally and/or alternatively, devices may be interested in receiving information regarding, for example, proximal or neighboring devices, such as proximal or neighboring vehicles. In an example embodiment, the method of switching resource pools comprises receiving information. In an example embodiment, the method of switching resource pools comprises receiving zone information. In an example embodiment, the method of switching resource pools comprises storing zone information. In an example embodiment, the method comprises receiving zone transmission resource pool information, for example from the AP. That is, the AP may transmit zone information that may comprise and/or further comprise, as described above, a transmission resource pool and/or transmission resource pools allocated to a zone. The device may store the received zone information. In an example embodiment, the method comprises receiving and/or storing zone information during manufacture, initialization, setup, updating, configuration or reconfiguration of the device. In an example embodiment, the method comprises receiving zone information. In an example embodiment, the method comprises storing zone information. As described above, the zone information may comprise size and/or location and/or allocated resource pool and/or allocated transmission resource pool information for one or more zones. For example, the zone information may include resource pool configurations for multiple zones, broadcast or transmitted via dedicated signaling by an AP, for idle and connected states of the device). The device may select a resource pool for transmission, for example, a resource pool corresponding to the current zone, as determined by the device.

It should be understood that a zone change, for example a change from a current zone to a target zone, may be similar to an inter-cell handover, as described above. That is, the zone change may require network connections to be altered, as described above with reference to the inter-cell handover. That is, the zone change may require the device to switch from the first resource pool to the second resource pool. However, a delay in device the switching from the first resource pool to the second resource pool due to the zone change may, for example, result in near-far problems, as described previously. Thus, this delay should be reduced and/or minimized.

In an example embodiment, the method of switching resource pools comprises determining a target zone, as described above. In an example embodiment, the method of switching resource pools comprises sensing the second resource pool, wherein the second resource pool is allocated to the target zone. In an example embodiment, the method of switching resource pools comprises sensing the second resource pool, wherein the second resource pool is a transmission resource pool allocated to the target zone. The second resource pool may be one of a plurality of resource pools allocated to the target zone. The plurality of resource pools allocated to the target zone may be received by and/or stored on the device, as described above. In an example embodiment, the method of switching resource pools comprises selecting the second resource pool from a plurality of resource pools allocated to the target zone.

In an example embodiment, the method of switching resource pools comprises sensing the second resource pool, wherein the second resource pool is a reception resource pool. The reception resource pool may include, for example, transmission resources of neighboring cells and thus may include, for example, transmission resources of a candidate (HO) target cell, of which the device is not aware before a cell change.

In an example embodiment, the result of the sensing the second resource pool is a result of sufficient sensing of the second resource pool. Sufficient sensing may be regarded as enough sensing for the device to select resources for which a likelihood of collisions is sufficiently low. The result of sufficient sensing may complete the sensing. Sufficient sensing may comprise, for example, measuring energy periodically for a duration over a time period. For example, sufficient sensing may comprise measuring energy for 200 ms every 1000 ms. Other durations, time periods and frequencies may be provided. Additionally and/or alternatively, sufficient sensing may be according to SA decoding, as described previously. For example, the device may switch based on the result of the sensing, comprising sufficient sensing. That is, a trigger to switch may be considered the result of the sensing, comprising sufficient sensing. In other words, the switch may be in response to the result of the sensing, comprising sufficient sensing.

In an example embodiment, the switching from the first resource pool to the second resource pool may be further based on determining a zone change, as described previously. For example, the device may switch based on the result of the sensing and determining the zone change. That is, a trigger to switch may be considered the result of the sensing and determining the zone change. In other words, the switch may be in response to the result of the sensing and determining the zone change.

In an example embodiment, the switching from the first resource pool to the second resource pool may be further based on determining a cell change, as described previously. For example, an idle device may switch based on the result of the sensing and determining the cell change. That is, a trigger to switch may be considered the result of the sensing and determining the cell change. In other words, the switch may be in response to the result of the sensing and determining the cell change.

In an example embodiment, the switching from the first resource pool to the second resource pool may be further based on a command, for example, a network command received from an AP or in a HO command. For example, a connected device may receive such a command and switch based on the result of the sensing and the command That is, a trigger to switch may be considered the result of the sensing and the command. In other words, the switch may be in response to the result of the sensing and the command.

It should be understood that the switching from the first resource pool to the second resource pool may be, for example, due to or required by or based on or in response a cell change or a zone change or a received command. For example, for a HO, the device may receive a command, as described above. For example, the cell change may include cell reselection. In addition, an expected cell change may also apply to a HO. For example, the device may start to sense and/or pre-sense according to the expected cell change due to the HO. In particular, the UE may determine expected cell change to be starting TTT for a particular measurement (, assumed to be configured for the purpose of HO, or including a particular indicator).

It should be understood that the first resource pool may be known as a source resource pool. The first resource pool may be associated with a first cell, for example a source cell, and/or a first zone, for example a source zone. For example, the first resource pool may be associated with a first eNB of the first cell. In other words, the first resource pool may be associated with a source eNB of the source cell. Similarly, it should be understood that the second resource pool may be known, for example, as a target resource pool.

It should be understood that the device may transmit based on a timing or synchronization of a cell, for example a current cell and/or a target cell, for which a transmission resource pool, for example the first resource pool and/or the second resource pool, is configured. That is, to transmit using a particular resource pool, the device may be required to maintain, for example, a timing reference of the corresponding cell.

In an example embodiment, the method comprises receiving information related to the second resource pool.

For example, the information related to the second resource pool may comprise information related to a specific resource allocated or assigned to the device. The information related to the second resource pool may be received from the network, for example from an AP such as an eNB or a source eNB. The information may be received in response to a request for information transmitted by the device. Alternatively, the information related to the second resource pool may be included on the device, for example, previously included on the device during manufacture, initialization, setup, updating, configuration or reconfiguration.

Additionally and/or alternatively, the information related to the second resource pool may comprise information related to a resource pool allocated or assigned to the device. In Mode 2 (also known as Autonomous Resource Selection), the network may allocate a resource pool to the device and the device may select a resource from the allocated resource pool. The device may be in an idle state, for example in a RRC_IDLE state, or may be in the out-of-coverage situation. In this way, interference and/or collisions with transmissions from other devices may be reduced.

Sensing may be used to obtain information for the device to predict interference conditions for future SL transmissions. Based on the sensing result, the device may autonomously select a suitable resource from the second resource pool. That is, the device may select the resource having a relatively lower expected interference for SL transmissions, for example, to improve system performance.

In an example embodiment, sensing is according to SA decoding. That is, sensing may be based on a SA scan, for example, PSCCH decoding, of other devices. Locations of SA transmissions may be known and may be decodable by the device. For example, blind decoding may be used. If a SA of another device is decoded, the device may be informed of future SA and/or data transmissions and/or resource utilizations by that other device. Since a number of PSCCH in a subframe may be restricted, a complexity of decoding by the device may be relatively low. However, decoding of all SAs from all devices may be relatively complex under, for example, high interference or low signal to noise ratio (SNR) conditions, which may occur in dense traffic scenarios.

In an example embodiment, sensing is according to energy measurement. Sensing according to energy measurement may be performed in the frequency domain. An energy threshold, for example, may be used to identify available resources for transmission. Compared with SA decoding, energy measurement may provide additional information on overall interference levels of a given resource, for example, in band emission and interferences from undetected SAs. Furthermore, energy measurement may still be useful even if SA decoding is not successful, for example, due to resource collision and/or misdetection of SAs. However, a reliability of the energy measurement may be relatively lower at low SNR and/or high mobility scenarios.

In an example embodiment, sensing is according to SA decoding and energy measurement.

In an example embodiment, the sensing the second resource pool during the first time period comprises sensing the second resource pool according to the received information related to the second resource pool.

In an example embodiment, the method comprises pre-sensing one or more second resource pools, for example, one or more candidate target transmission resource pools allocated by a target zone and/or target cell. In an example embodiment, the sensing comprises pre-sensing one or more second resource pools, for example, one or more candidate target transmission resource pools allocated by a target zone and/or target cell.

In an example embodiment, the method comprises pre-sensing one or more second resource pools, for example, one or more reception resource pools. In an example embodiment, the sensing comprises pre-sensing one or more second resource pools, for example, one or more reception resource pools. Such reception resource pools may cover neighboring transmission resource pools, for example. In this way, information related to candidate target transmission resource pools allocated by a target zone and/or target cell, for example, may not be required for the pre-sensing.

In an example embodiment, the method comprises determining a state transition of the device; and wherein the switching from the first resource pool to the second resource pool is based on the result of the sensing the second resource pool and the determining the state transition.

In accordance with another aspect of the present disclosure, a device is provided. The device includes a transmitter and a receiver, wherein the device is arranged to transmit according to a first resource pool, sense a second resource pool, and switch from the first resource pool to the second resource pool, based on a result of the sensing the second resource pool, wherein the device is arranged to transmit according to the second resource pool.

The device may be arranged to switch from the first resource pool to the second resource pool by determining if the second resource pool has been sensed sufficiently long to apply sensing based resource selection, and based on a result of the determining: using sensing based resource selection if the second resource pool has been sensed sufficiently long to apply sensing based resource selection, and using random resource selection for the second resource pool if the second resource pool has not been sensed sufficiently long to apply sensing based resource selection.

If the switch from the first resource pool to the second resource pool comprises using random resource selection for the second resource pool, the device may be arranged to change, for the second resource pool, from using random resource selection to using sensing based resource selection based on a result of the sensing the second resource pool.

The device may be arranged to implement any combination of the operations described above with respect to the method of switching resource pools. In an example embodiment, the device is arranged to implement any of the methods described herein.

In an example embodiment, the device is arranged to receive information related to the second resource pool.

In an example embodiment, the device is arranged to sense the second resource pool according to the received information related to the second resource pool.

In an example embodiment, the device is arranged to determine an expected cell change; and to start sensing based on the determining the expected cell change. For example, the sensing may be in response to the determining the expected cell change. Such sensing based on the determining the expected cell change may be considered pre-sensing. Pre-sensing may also not be started upon expecting a cell or zone change but more continuous, i.e., in anticipation of any potential cell or zone changes, the UE may sense a pool it can use in exceptional cases/to avoid interruptions (as a ready to use fall-back pool). The expected cell change may, for example, be determined according to a measurement related to a cell change such as a start of a time to trigger (TTT) or treselection timer. In an example embodiment, the device is arranged to determine a cell change and the switching from the first resource pool to the second resource pool is based on the result of the sensing the second resource pool and the determining the cell change.

In an example embodiment, the device is arranged to determine an expected zone change; and to start sensing based on the determining the expected zone change. For example, the sensing may be in response to the determining the expected zone change. Such sensing based on the determining the expected zone change may be considered pre-sensing. The expected zone change may, for example, be determined according to an approach to or a distance from a zone border. In an example embodiment, the device is arranged to determine a zone change; and switch from the first resource pool to the second resource pool based on the result of the sensing the second resource pool and the determined zone change.

may also receive information and/or a command to switch from the second resource pool to the third resource pool, as described above.

In an example embodiment, the device is arranged to sense according to SA decoding.

In an example embodiment, the device is arranged to sense according to energy measurement.

In an example embodiment, the device is arranged to determine a cell. For example, the device may be arranged to determine a current cell, that is, a cell in which the device is currently located. Additionally and/or alternatively, the device may be arranged to determine an adjacent cell, that is, a cell adjacent to the current cell. For example, if the device is moving in the current cell towards a border of the current cell, the device may be arranged to determine a target cell, that is, the adjacent cell towards which the device is moving. The device may be arranged to determine that the border of the current cell will be and/or is being and/or has been crossed. That is, the device may be arranged to determine a cell change and/or an expected cell change, for example from the current cell to the target cell. In an example embodiment, the device is arranged to determine a cell change. In an example embodiment, the device is arranged to determine an expected cell change. In an example embodiment, the device is arranged determine a

TABLE 1

| Case | First resource pool | Second resource pool | Third resource pool | Notes |
|---|---|---|---|---|
| Zone change | Pool of source zone | Pool of target zone | N/A | Within cell, or when same configuration applies in neighboring cell. In case of inter-cell, device needs to apply timing of target cell. Device either synchronizes early, but maybe case would be limited to case source and target eNB are synchronized. |
| Cell change (discontinuous pool or zone configuration) | Pool of source cell | Fall-back pool of source cell | Pool of target cell | Exceptional pool of source cell could be used as fall-back (or new dedicated pool). In idle state, device detects change of cell, while in connected state, the network indicates. |

Table 1 Example of resource pool usage for zone and cell changes.

In an example embodiment, the device is arranged to: receive a command; and switch from the first resource pool to the second resource pool based on the result of the sensing the second resource pool and the command.

In an example embodiment, the device is arranged to determine a state transition of the device; and switch from the first resource pool to the second resource pool based on the result of the sensing the second resource pool and the determining the state transition.

In an example embodiment, the device is arranged to sense a third resource pool; and switch from the second resource pool to the third resource pool, based on a result of the sensing the third resource pool, wherein the device is arranged to transmit according to the third resource pool. For example, the device may switch to the second resource pool, for example a temporary resource pool (also known as a fallback pool or an exceptional resource pool), according to an internal trigger, for example, indicating that the device is not permitted or allowed to use the first resource pool or that use of the third resource pool is not appropriate. The device target cell, as described above. In an example embodiment, the device is arranged to sense the second resource pool, wherein the second resource pool is allocated to the target cell.

In an example embodiment, the device is arranged to receive zone information. In an example embodiment, the device is arranged to store zone information. In an example embodiment, the device is arranged to store received zone information. In an example embodiment, the device is arranged to be provided with and/or store zone information during manufacture, initialization, setup, updating, configuration or reconfiguration.

In an example embodiment, the device is arranged to determine a zone, for example according to a modulo operation.

In an example embodiment, the device is arranged to receive zone transmission resource pool information, for example from the AP. The device may be arranged to store the received zone information. In an example embodiment, the device is provided with and/or store zone information during manufacture, initialization, setup, updating, configuration or reconfiguration. In an example embodiment, the device is arranged to receive zone information. In an example embodiment, the device is arranged to store zone information. As described above, the zone information may comprise size and/or location and/or allocated resource pool and/or allocated transmission resource pool information for one or more zones.

In an example embodiment, the device is arranged to determine a target zone, as described above. In an example embodiment, the device is arranged to sense the second resource pool, wherein the second resource pool is a transmission resource pool allocated to the target zone. In an example embodiment, the device is arranged to select the second resource pool from a plurality of resource pools allocated to the target zone.

Switching from the first resource pool RP1 to the second resource pool RP2 (e.g., a target pool, a temporary resource pool, a fallback pool, an exceptional resource pool) may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device may be arranged to change, for the second resource pool RP2, from using random resource selection to using sensing based resource selection based on a result of the sensing the second resource pool RP2.

In an example embodiment, the device is arranged to start sensing the second resource pool relatively early, for example in mobility and/or non-mobility cases.

The non-mobility cases, such as connection establishment, connection establishment following power up, connection re-establishment, reconfiguration, and/or radio link failure (RLF) may be covered by a second resource pool. For example, the device may pre-sense the second resource pool that may be provided by serving cell, to handle interruptions during connection establishment, reconfiguration of the pool of device autonomously-selectable transmission resources and/or RLF.

However, some of the cases in which the second resource pool is to be used may be unpredictable, for example, connection establishment, connection establishment following power up, connection re-establishment and/or reconfiguration. The device may anticipate or predict the occurrence of a RLF before the RLF occurs. However, it may not be possible for the device to anticipate or predict all RLF cases, for example, is in advance. Similarly, it may not be possible for the device to anticipate or predict other cases in which the second resource pool is to be used. Instead, the device may be required to sense the second resource pool, for example continuously, intermittently, periodically, if the second resource pool is included or configured in SIB21, for example.

The device may sense, for example continuously sense, the second resource pool, if the second resource pool is included or configured in SIB21, to enable use of sensing whenever using this second resource pool. Additionally and/or alternatively, one or more of the cases in which the second resource pool is to be used may be unpredictable, as described above and/or may be relevant to non-mobility related events. Sensing based resource selection may still be possible for such cases by requiring the device to sense the exceptional transmission pool if the second resource pool is included or configured in SIB21. For example, the device may perform sensing on the resources of the pool indicated by v2x-CommTxPoolExceptional within SystemInformationBlockType21, before the device transmits using the pool of resources. However, there may still be cases in which the device wants to transmit V2X communication while sensing, for example, power on. Random selection may not be allowed for a pool for which sensing is required, since this could reduce a benefit of sensing. However, for the second resource pool, such mixed approach (i.e., random selection and sensing) is may be acceptable.

In an example embodiment, the device is arranged to use the second resource pool, for example included in SIB21, wherein the device has not performed sensing for a required duration, for example a pre-determined duration, of the second resource pool and wherein the device is allowed to use random selection for this second resource pool.

However, while the device may be allowed to perform random selection of the second resource pool, sensing of this pool may not be determined by device implementation. That is, sensing of this pool may be required rather than optional, for example. A benefit of requiring the device to sense this pool may depend, for example, on a frequency of use of the second resource pool. For example, the frequency of use of the second resource pool may be determined by an average number of idle to active transitions. For example, if there is such an idle to active transition every 10 s, requiring pre-sensing could avoid that in 10%, less than 10%, more than 10% of the time, random selection is otherwise used.

In an example embodiment, the device is configured to transmit V2X communication, wherein the device is required to continuously sense a second resource pool, for example an exceptional transmission pool, if the second resource pool is configured, for example pre-configured, configured in SIB21.

The mobility cases, such as zone change, cell change, moving out of coverage and/or RLF may be covered by a second resource pool. Typically, the device may pre-sense a relevant neighboring transmission pool in advance of a zone change, for example. For a HO, the device may use random selection of the second resource pool. For example, E-UTRAN may include the second resource pool in an HO command, for example in a v2x-CommTxPoolExceptional within mobilityControlInfoV2X.

For example, if T304 is running and the UE is configured with v2x-CommTxPoolExceptional included in mobilityControlInfoV2X in RRCConnectionReconfiguration, lower layers may be configured to transmit SCI and corresponding data using random selection using a pool of resources indicated by v2x-CommTxPoolExceptional.

In a case of a cell change in RRC_IDLE, service interruption may exceed 1 s, for example due to covering SIB21 acquisition and/or initial sensing delay. Hence, the device may use the second resource pool in SIB21 combined with random selection to address, for example, the case of cell change and/or re-selection. This approach may cover connection establishment for a case in which the device employs a normal pool, for example a source pool or the first resource pool, in SIB21 but has not yet complete sensing (e.g., power on).

In an example embodiment, the device is configured to use a normal pool, for example a source pool or the first resource pool, for example included in SIB21, wherein the device has not performed sensing for a required duration, for example following cell re-selection, wherein the device is configured to use the second resource pool, for example included in SIB21, with random selection.

A size of a pool for which random selection is allowed may need to increase to obtain similar performance as, for example, a pool that is sensed. To avoid that sizes of all pools need to increase to accommodate random selection, it may be preferable to limit random selection to the second resource pool(s) only.

Additionally and/or alternatively, for cell change in idle mode, a bit may be included in SIB21 indicating whether neighboring cells employ the same zone based transmission pool configuration. If the bit is set, the device may employ a pre-sensing operation in advance of a zone change, for example, as for a case of intra-cell. This option may be used in conjunction with wherein the device is configured to use a normal pool, for example included in SIB21, wherein the device has not performed sensing for a required duration, for example following cell re-selection, wherein the device is configured to use the exceptional pool, for example included in SIB21, with random selection. In this way, use of the exceptional pool (with random selection) may be controlled and/or reduced and/or minimized.

In an example embodiment, a bit, for example in SIB21, indicates whether a neighboring cell and/or a plurality of neighboring cells employ a same zone based transmission pool configuration.

If the device moves out of coverage, the device may switch to a preconfigured pool. Such a case can be regarded to be similar to change of zone within a cell, as described previously. That is, the device may pre-sense an appropriate preconfigured transmission pool in advance of moving out of coverage. Upon return to coverage, the device may temporarily employ a second resource pool, if included in SIB21, and optionally, initially using random selection, for example. This may be appropriate for when a transmission pool is provided in SIB21, for example by v2x-CommTx-PoolNormalCommon. That is, random selection may be restricted to the second resource pool.

In an example embodiment, upon return from out of coverage, a device configured to use a transmission pool provided in SIB21 is arranged to use, for example to temporarily use, the second resource pool included in SIB21 using random selection, for example until the device completes sensing of the normal pool, for example a source pool or the first resource pool.

The device may be arranged to start sensing a transmission pool of a neighboring zone and/or transmission pools of neighboring zones relatively early, for example, according to a criterion. For example, the criterion may be when a distance to the neighboring zone is or becomes below a threshold distance or a pre-determined distance, such as a threshold or predetermined percentage of a size of the zone. By defining device requirements regarding pre-sensing due to device mobility, for example, may depend on an interval or an average interval between mobility related pool changes. For example, if a relatively poor device implementation does not employ pre-sensing (i.e., does not start sensing prior to zone change), the device would initially use random selection of resources from the second resource pool (i.e., an exceptional resource pool) and use the second resource pool during the first second (1 s) following a zone change. Subsequently, the device may use sensing based selection of resources from a normal pool (e.g., a target pool or a third resource pool) applicable in that zone. If however there is a zone change every 1 s, the relatively poor device implementation will never enter a mode in which it employs sensing based resource selection.

If pre-sensing is not required, for example, the relatively poor device implementation may not employ sensing based selection when changing zone frequently, for example, every 1 s.

In an example embodiment, device requirements are specified regarding pre-sensing of transmission pools of a neighboring zone and/or neighboring zones.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 16 schematically depicts signaling extensions for an embodiment of the present disclosure;

FIGS. 17A and 17B schematically depicts signaling extensions for an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
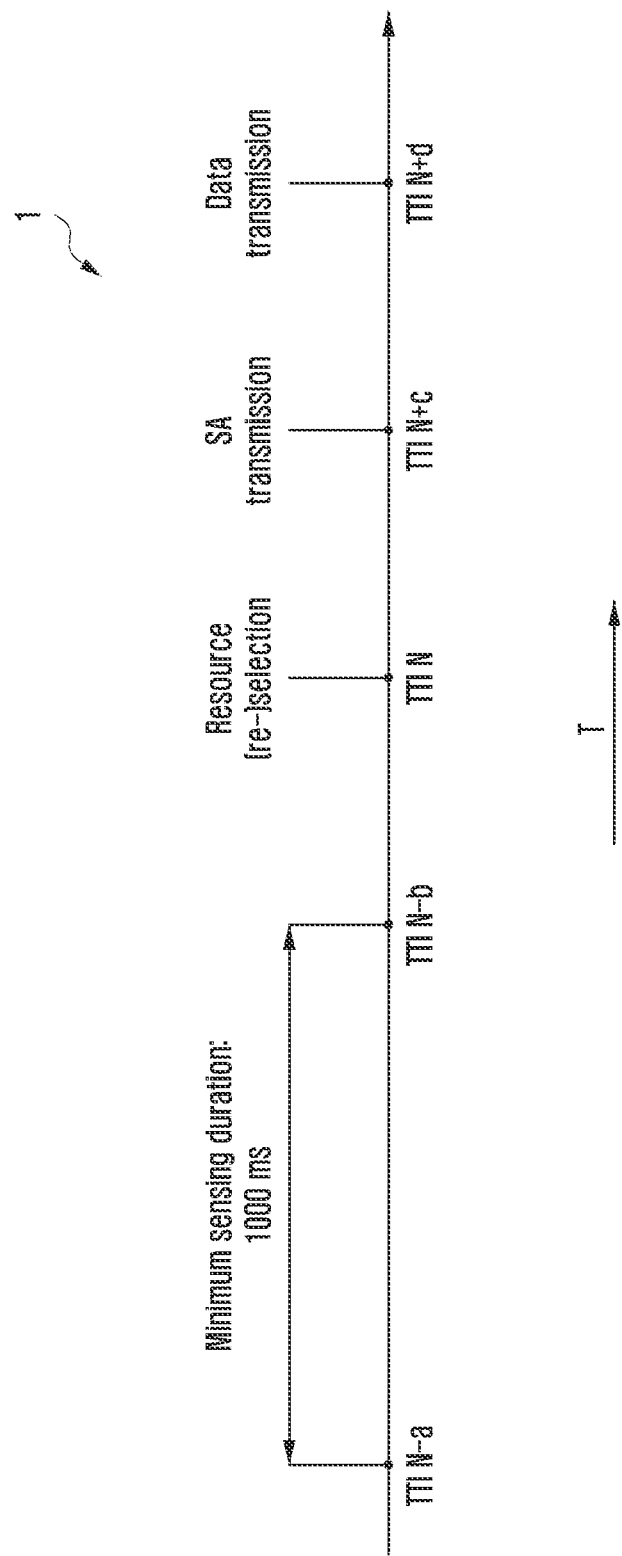
FIG. 1 schematically depicts a device according to the prior art, in use according to an embodiment of the present disclosure.
Figure 2:
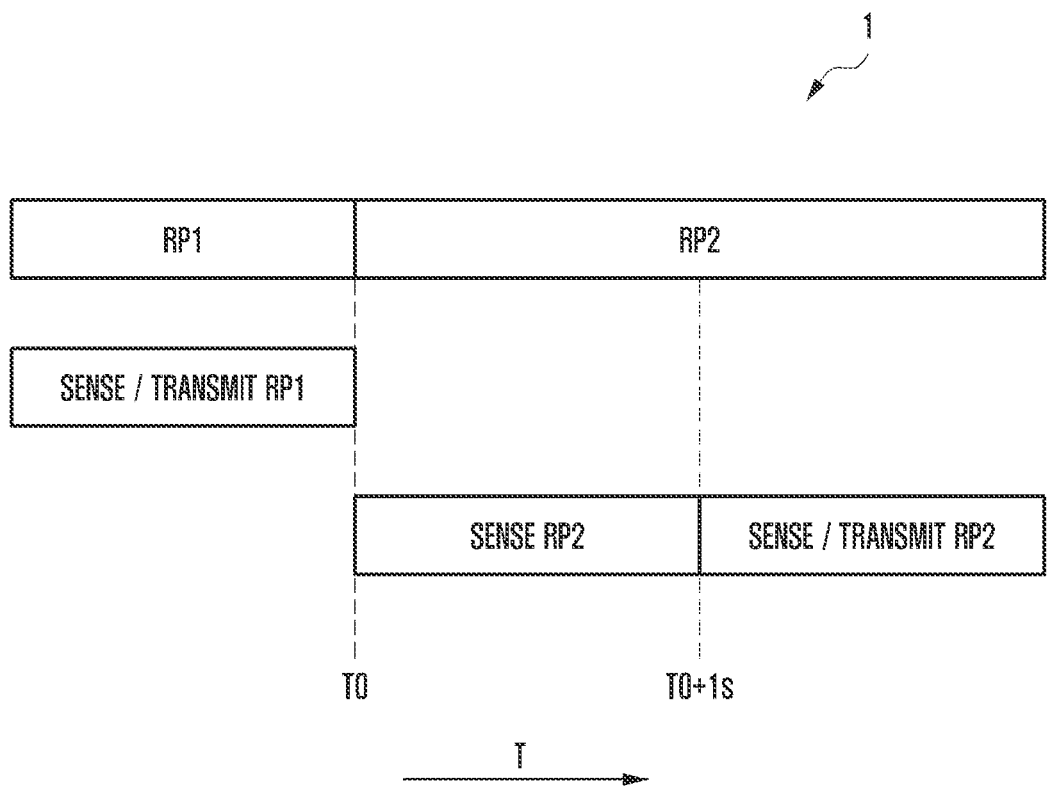
FIG. 2 schematically depicts the device of FIG. 1, in use according to an embodiment of the present disclosure.

FIGS. 1 and 2 schematically depict a device 1 according to the prior art, in use. The device 1 is arranged to transmit according to a first transmission resource pool RP1. Particularly, the device 1 is arranged to switch from the first transmission resource pool RP1 to a second transmission resource pool RP2 before sensing the second transmission resource pool RP2. In this way, transmission interruption may result, as described previously.

Referring to FIG. 1, FIG. 1 shows that at transmission time interval (TTI) N, resource selection is triggered in Mode 2 (i.e., Autonomous Resource Selection), as described above. Hence, at an earlier TTI N-a, the device 1 switches from the first transmission resource pool RP1 to the second transmission resource pool RP2. For a time period from TTI N-a to TTI N-b, the device 1 senses the second transmission resource pool RP2. At TTI N+c, the device 1 transmits a scheduling assignment (SA), indicating associated data which are transmitted at TTI N+d. a-d are integer times, in milliseconds (ms). The values of a and b may be fixed and may be common for all V2V UE, for example. Particularly, a=1000+b ms. The values of c and/or d may be greater than 0 ms and/or less than or equal to 100 ms. Particularly, d>=c ms. Thus, the data transmitted by the device 1 at TTI N+d according to the second transmission resource pool RP2 are transmitted (a+b+c+d) ms after the switch from the first transmission resource pool RP1 to the second transmission resource pool RP2 at TTI N-a. Assuming b=c=d=0 ms and since a=1000 ms, a minimum delay or transmission interruption is 1000 ms (1 s).

More generally, FIG. 2 schematically shows the device 1 switching from the first transmission resource pool RP1 to the second transmission resource pool RP2, as described above. Prior to a time T0, the device 1 is arranged to transmit and to sense according to, for example via, the first transmission resource pool RP1. The device 1 is arranged to switch from the first transmission resource pool RP1 to a second transmission resource pool RP2 at the time T0. From the time T0, the device 1 is not allowed to use, for example sense and/or transmit, according to the first transmission resource pool. For a time period from T0 to T0+1 s (i.e., 1 s), the device 1 is arranged to sense the second transmission resource pool RP2. During this time period from T0 to T0+1 s (i.e., 1 s), the device 1 is not arranged to transmit according to, for example via, the second transmission resource pool RP2. After sufficient sensing (i.e., at T0+1 s), the device 1 is arranged to transmit according to, for example via, the second transmission resource pool RP2. That is, when the device 1 is provided with a new transmission resource pool, such as the transmission resource pool RP2, a transmission interruption of 1 s may result before the device 1 may start to transmit via the new transmission resource pool.

The transmission interruption, as described above, may arise in various scenarios.

In a first scenario, related to a HO, an UE is configured with a first transmission resource pool RP1 in a source cell. During HO from the source cell to a target cell, the UE is configured with a second transmission resource pool RP2, for use in the target cell. A transmission interruption of 1 s may result, as described above. Particularly, following a HO command, a source eNB of the source cell cannot schedule the UE until the HO has been successfully completed. Furthermore, after receiving the HO command, the UE is not allowed to continue to select resources from the first transmission resource pool RP1 configured, for example, by the source eNB. In addition, reception resource pools provided by the source cell may not cover all transmission resource pools used in the target cell. Some may regard this, for example, as network misconfiguration, i.e., as reception pools should in general facilitate transmissions by nearly UEs using transmission pool of neighboring cells. This first scenario may similarly apply, for example, to a state transition.

In a second scenario, related to a HO, an UE is configured with a first transmission resource pool RP1 in a source cell. During HO from the source cell to a target cell, the UE is configured with a second transmission resource pool RP2, for use, during the HO. A first transmission interruption of 1 s may result, as described above. Subsequently, the UE is configured with a third transmission resource pool RP3, for use, during in the target cell. A second transmission interruption of 1 s may result, as described above. Particularly, synchronization and reception resource pool configurations for the target cell can be signaled in the HO command.

In a variation of this scenario, related to a HO, either the network schedules the transmission resources of the UE (i.e., Mode 1) or the UE is configured with a first transmission resource pool RP1 in a source cell, while in the target cell the network schedules transmission resources (i.e., Mode 1). In this case, a(n) (exceptional) transmission resource pool configuration for the target cell may be signaled in the HO command. If the (exceptional) transmission resource pool configuration is included in the HO command, the UE starts using the (exceptional) transmission resource pool from the reception of the HO command and continues to use this pool while a T304 HO time is running.

For example, if the UE is configured with network scheduled resources (Mode 1) for a target cell, the UE may be provided with a pool of UE autonomously selectable (exceptional) transmission resources (Mode 2) that the UE may use while a T304 timer is running (i.e., from receiving a HO command until successful completion of random access). This (exceptional) pool may be intended to enable transmission while the T304 timer is running. However, due to RAN1 sensing requirements, it may take at least 1 s before the UE may transmit data via the transmission resource pool provided in the HO command. Hence, it will only reduce interruption of V2V sidelink communication transmission in a case that it would take longer than 1 s to complete HO. In addition, if the UE is configured for the target cell with a pool of UE autonomously selectable transmission resources, the RAN1 sensing requirements may result in V2V sidelink communication transmission being interrupted for at least 1 s.

In a third scenario, related to a zone change, an UE is required to use a first transmission resource pool RP1 in a first zone, prior to a time T0, as described above. Due to a mobility of the UE, the UE is required to use a second transmission resource pool RP2 in an adjacent second zone, after the time T0, as described above. A transmission interruption of 1 s may result, as described above.

For example, if E-UTRAN configures geographical zone specific transmission pools, the UE should switch to another transmission resource pool upon change of geographical zone, similar to HO. Correspondingly, given the RAN1 sensing requirements described above, a change of zone may result in an equally large interruption of V2V sidelink communication transmission as upon HO, when the UE is configured with a UE autonomously selectable resource pool.

In a fourth scenario, related to a state transition, an UE is supposed to use a first transmission resource pool RP1 in an IDLE state, prior to a time T0, as described above. Due to a state transition of the UE, the UE is required to change to a second transmission resource pool RP2, with dedicated signaling, in a CONNECTED state, after the time T0, as described above. A transmission interruption of 1 s may result, as described above.

For example, the UE in idle Mode transmits sidelink communication using the pool of resources indicated by commTxPoolNormalCommon, if included in SystemInformationBlockType18. During connection establishment, E-UTRAN may either configure the UE with network scheduled resources (Mode 1), or with a pool of UE autonomously selectable (exceptional) transmission resources (Mode 2), to be used from the moment the UE receives the resources (i.e., by RRCConnectionReconfiguration including sl-CommConfig). Until the UE receives this message, the UE may continue using the normal transmission pool, for example a source pool or the first resource pool, for idle Mode (i.e., indicated by commTxPoolNormalCommon in SIB18) or, if not such pool is not configured, the exceptional pool indicated by commTxPoolExceptional in SIB18. In case E-UTRAN configures the normal transmission pool, for example a source pool or the first resource pool, for idle Mode and employs a similar transmission pool of UE autonomously selectable in connected mode, it may again take at least 1 s before the UE may transmit data via that transmission pool configured during connection establishment. In case E-UTRAN does not configure the normal transmission pool, for example a source pool or the first resource pool, for idle Mode but configures an exceptional pool of UE autonomously selectable transmission resources, this may not avoid interruption as due to sensing, it will take at least 1 s before the UE may transmit data via that transmission pool.

For example, within a HO command, E-UTRAN may include an exceptional pool (also known as a temporary or fallback pool), for example an exceptional transmission or Tx pool. The UE may use this exceptional pool upon HO completion with random resource selection, for example. Additionally and/or alternatively, E-UTRAN may broadcast an exceptional pool, for example an exceptional transmission or Tx pool, in SIB21. The UE may use this broadcast exceptional pool with sensing based resource selection.

In a fifth scenario, related to moving out of coverage, an UE may be required to use a new pool, which may be referred to as a target pool. The target pool may be a transmission pool for use when the UE is out of coverage. The UE may be pre-configured to use the target pool when the UE is out of coverage. In this scenario, transmission interruption may occur due to sensing the target pool. Specifically, if the UE has not completed sensing the target pool before moving out of coverage, transmission interruption may occur, as described previously.

Figure 3:
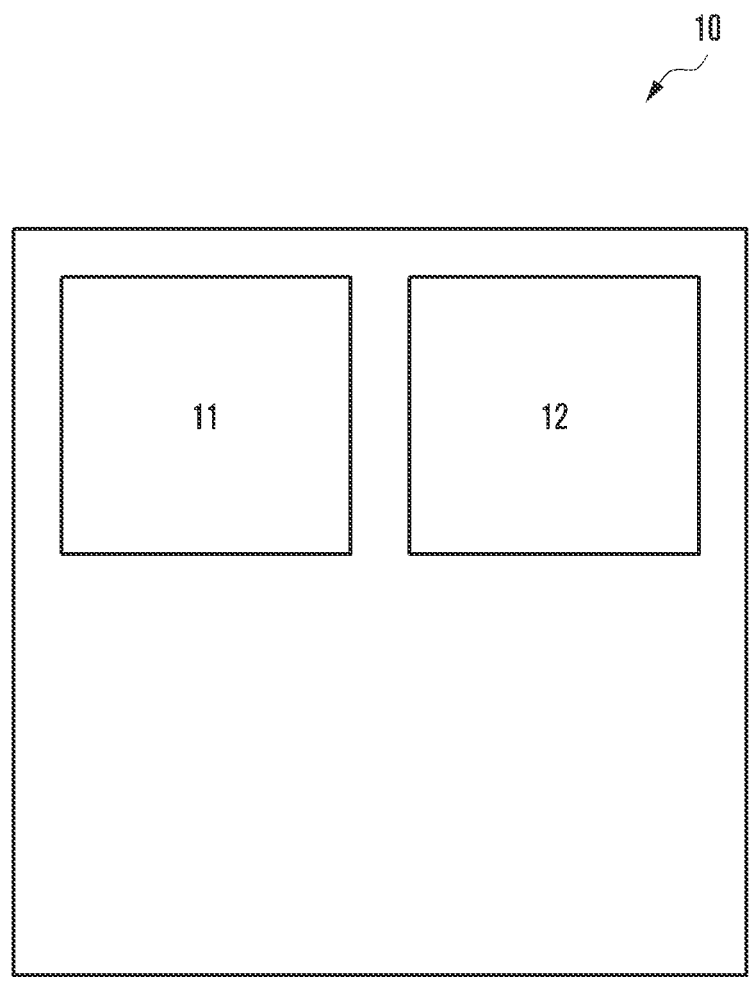
FIG. 3 schematically depicts a device according to an embodiment of the present disclosure.

FIG. 3 schematically depicts a device 10 according to an embodiment of the present disclosure. The device 10 comprises a transmitter 11 and a receiver 12. The device 10 is arranged to transmit according to a first resource pool. The device 10 is arranged to sense a second resource pool. The device 10 is arranged to switch from the first resource pool RP1 to the second resource pool RP2, based on a result of the sensing the second resource pool RP2, wherein the device 10 is arranged to transmit according to the second resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2. In this way, a transmission interruption, as described above, may be reduced.

Particularly, by sensing the second resource pool RP2 while transmitting according to the first resource pool RP1 and switching from the first resource pool RP1 to the second resource pool RP2 after sensing the second resource pool, latency and/or interruption of transmission arising from switching, for example, may be reduced or avoided according to the related art. In this way, a QoS may be improved such that, for example, compromise of safety critical systems may be lowered or averted.

The device 10 is arranged to sense according to SA decoding and/or energy measurement, as described above. Based on the result of the energy sensing, the device 10 may autonomously select a suitable resource from the second resource pool RP2.

The device 10 also comprises a processor and a memory (not shown). The device 10 may also comprise a storage 13 (not shown). The device 10 may be arranged to implement any of the methods of switching resources described herein. The device 10 may comprise an UE, as described above, for example, for D2D communication, including V2V.

Figure 4:
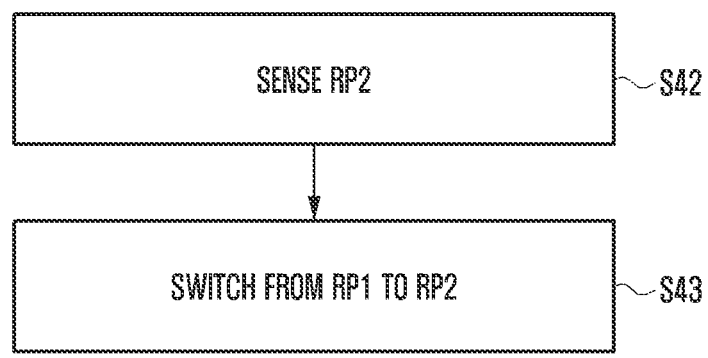
FIG. 4 schematically depicts a method of switching resource pools according to an embodiment of the present disclosure.

FIG. 4 schematically depicts a method of switching resource pools according to an embodiment of the present disclosure, the method implemented by the device 10, as described above.

The device 10 is arranged to transmit according to a first resource pool RP1. At S42, the device 10 senses a second resource pool RP2. At S43, the device 10 switches from the first resource pool RP1 to the second resource pool RP2, based on a result of the sensing the second resource pool RP2, wherein the device 10 is arranged to transmit according to the second resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2. In this way, a transmission interruption, as described above, may be reduced.

The method may comprise any of the operations described herein.

The method may comprise sensing according to SA decoding and/or energy measurement, as described above. Based on the result of the energy sensing, for example sufficient sensing, the method may comprise selecting a suitable resource from the second resource pool RP2. Sufficient sensing may comprise, for example, measuring energy periodically for a duration over a time period. For example, sufficient sensing may comprise measuring energy for 200 ms every 1000 ms. Other durations, time periods and frequencies may be provided.

Figure 5:
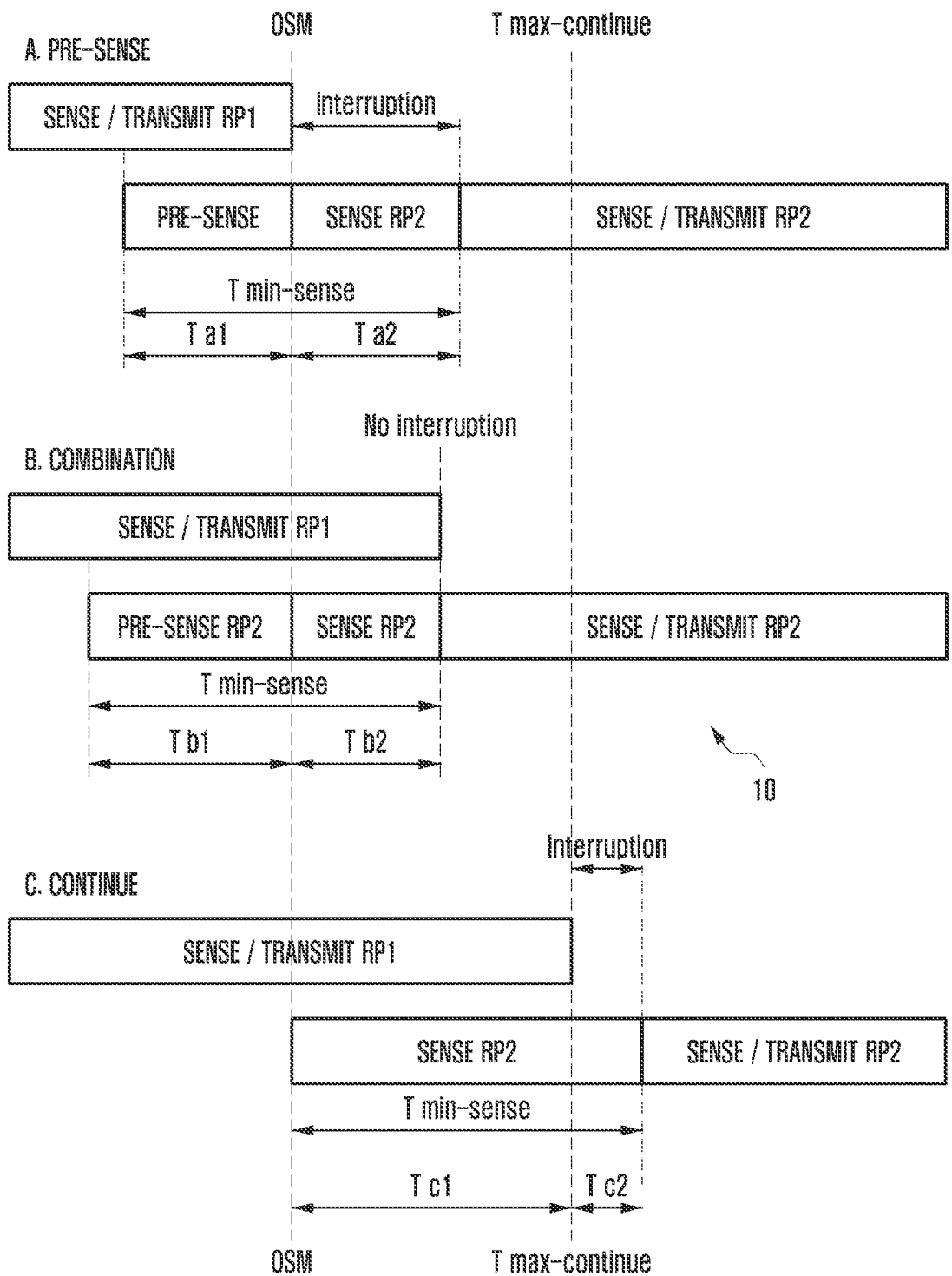
FIG. 5 schematically depicts a device according to an embodiment of the present disclosure, in use.

FIG. 5 schematically depicts the device 10 according to an embodiment of the present disclosure, in use.

An optimal switching moment (OSM) may be defined. The OSM may be the moment, for example a time, an absolute time or a relative time, at which the device should, for example, be required to or ideally switch to using the second transmission resource pool RP2. For example, for a cell change, the OSM may correspond with the device 10 entering the target cell. For example, for a zone change, the OSM may correspond with the device 10 entering the target zone. For example, for continued use of the first transmission resource pool after the OSM may result in near-far problems, as described above.

In principle, there may be two independent moments or times: a first moment or time when the device 10 switches resources pools, for example, stops using the first resource pool; and a second moment or time when the device 10 starts transmitting using the second resource pool. The first moment and the second moment may not be coincident, for example, a same moment or time. For example, it may be undesirable to continue to use the first resource pool for too long after the OSM because near-far problems may result. For example, in order for the device 10 to transmit according to the second resource pool, the device 10 must sense for sufficiently long. That is, sufficient sensing may be required, as described previously. In this way, for example, the device 10 may select resources for which the likelihood collisions occur is sufficiently low.

In detail, FIG. 5 shows three example cases: case A, comprising pre-sensing only; case B, comprising pre-sensing and continued use; and case C, comprising continued use only.

In case A, the device 10 senses and/or transmits according to the first resource pool RP1 during a time prior to the OSM. The device 10 pre-senses the second resource pool RP2 for a time T a1 prior to the OSM. At the OSM, the device 10 stops sensing and/or transmitting according to the first resource pool RP1. However, since the pre-sensing time T a1 is less than a minimum sensing time T min-sense required for sufficient sensing, the device 10 continues to sense the second resource pool RP2 for a further time T a2 after the OSM. After sensing for a total time (T a1+T a2)>=T min-sense, the device 10 starts transmitting according to the second resource pool RP2. That is, an interruption for the time T a2 after the OSM results from the sensing.

In case C, the device 10 senses and/or transmits according to the first resource pool RP1 during a time prior to the OSM. At the OSM, the device 10 continues sensing and/or transmitting according to the first resource pool RP1 for a further time until a time T max-continue, which may be a maximum time after the OSM during which the device 10 may continue sensing and/or transmitting according to the first resource pool RP1. At the OSM, the device 10 starts sensing the second resource pool RP2 for a time T c1 up to the time T max-continue. At the time T max-continue, the device 10 stops sensing and/or transmitting according to the first resource pool RP1. However, since the sensing time T c1 is less than the minimum sensing time T min-sense required for sufficient sensing, the device 10 continues to sense the second resource pool RP2 for a further time T c2 after the time T max-continue. After sensing for a total time (T c1+T c2)>=T min-sense, the device 10 starts transmitting according to the second resource pool RP2. That is, an interruption for the time T c2 after the time T max-continue results.

In case B, the device 10 senses and/or transmits according to the first resource pool RP1 during a time prior to the OSM. The device 10 pre-senses the second resource pool RP2 for a time T b1 prior to the OSM. At the OSM, the device 10 continues sensing and/or transmitting according to the first resource pool RP1 for a further time T b2 less than the time T max-continue. Particularly, at the OSM, the device 10 continues sensing the second resource pool RP2 for a time T b2 after the OSM. That is, the further time T b2 corresponds with sensing for a total time (T b1+T b2)>=T min-sense. Hence at the time T b2, the device 10 stops sensing and/or transmitting according to the first resource pool RP1 and the device 10 starts transmitting according to the second resource pool RP2. That is, no interruption results from the sensing.

For example, upon an expected cell change, the device 10 may pre-sense the resources:

a) Indicated by a reception resource pool (i.e., a broader pool including transmission resources used by nearby devices in neighboring cells, using transmission resources of those cells);

b) Of the particular expected and/or candidate target cell(s). For this option, the device 10 needs information related to transmission resource pools of all neighbor cells;

c) If zones are used, and the network or the AP indicates that the zone based pool configuration continues unchanged: the resources corresponding to the zone across the cell border, which the device 10 may determine based on the current configuration (if zone border coincide with cell border, for example).

Figure 6:
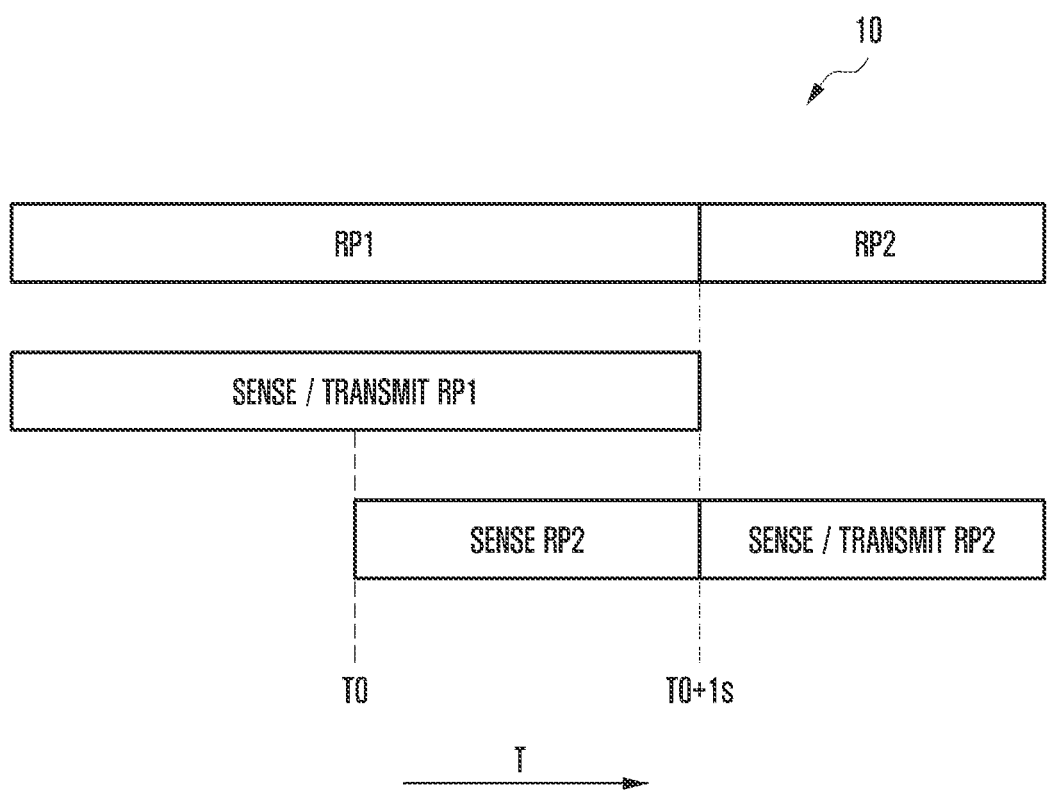
FIG. 6 schematically depicts a method of switching resource pools according to an embodiment of the present disclosure.

FIG. 6 schematically depicts the device 10 according to an embodiment of the present disclosure, in use.

Prior to a time T0, the device 10 is arranged to transmit and to sense according to, for example via, a first transmission resource pool RP1. For a time period from T0 to T0+1 s (i.e., 1 s), the device 10 is arranged to sense a second transmission resource pool RP2. In contrast to the device 1, during the time period from T0 to T0+1 s, the device 10 is allowed to use and/or may continue to use, for example sense and/or transmit, according to the first transmission resource pool RP1. In contrast to the device 1, the device 10 is arranged to switch from the first transmission resource pool RP1 to the second transmission resource pool RP2 at the time T0+1 s, based on a result of the sensing during the time period from T0 to T0+1 s. From the time T0+1 s, the device 10 is arranged to use, for example sense and/or transmit, according to the second transmission resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2.

That is, when the device 10 is provided with a new transmission resource pool, such as the transmission resource pool RP2, a transmission interruption before the device 10 may start to transmit via the new transmission resource pool, such as the transmission resource pool RP2, may be reduced, minimized or avoided, in contrast with the device 1.

That is, the switch of the device 10 from the first transmission resource pool RP1 to the second transmission resource pool RP2 at the time T0+1 s may be considered to be delayed with respect to the switch of the device 1, as described above. However, in contrast to the device 1, the device 10 is allowed to use and/or may continue to use, for example sense and/or transmit, according to the first transmission resource pool RP1 during the time period from T0 to T0+1 s. In this way, delaying the switch of the device 10 from the first transmission resource pool RP1 to the second transmission resource pool RP2, as described, implementation may be relatively simple. However, by delaying the switch of the device 10 from the first transmission resource pool RP1 to the second transmission resource pool RP2, as described, use of an optimal transmission resource pool such as the second transmission resource pool RP2 is delayed, which may result in near-far problems.

Figure 7:
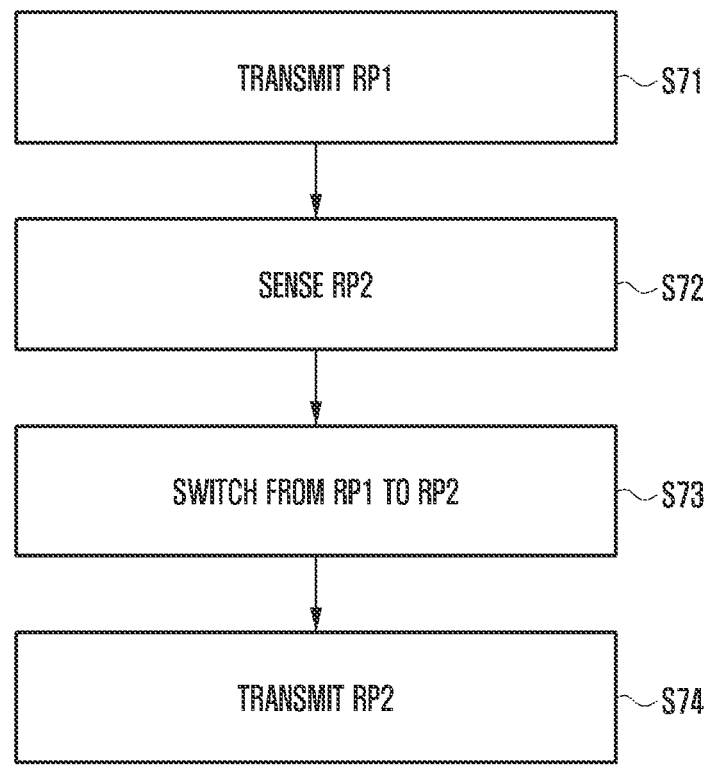
FIG. 7 schematically depicts a device according to an embodiment of the present disclosure, in use.

FIG. 7 schematically depicts a method of switching resource pools according to an embodiment of the present disclosure, the method implemented by the device 10, as described above.

The device 10 is arranged to transmit according to a first resource pool RP1. At S71, the device transmits according to, for example via, the first resource pool RP1. At S72, the device 10 senses a second resource pool RP2. At S73, the device 10 switches from the first resource pool RP1 to the second resource pool RP2, based on a result of the sensing the second resource pool RP2 or using random resource selection of the second resource pool RP2, wherein at S74 the device 10 is arranged to transmit according to the second resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2. In this way, a transmission interruption, as described above, may be reduced.

Figure 8:
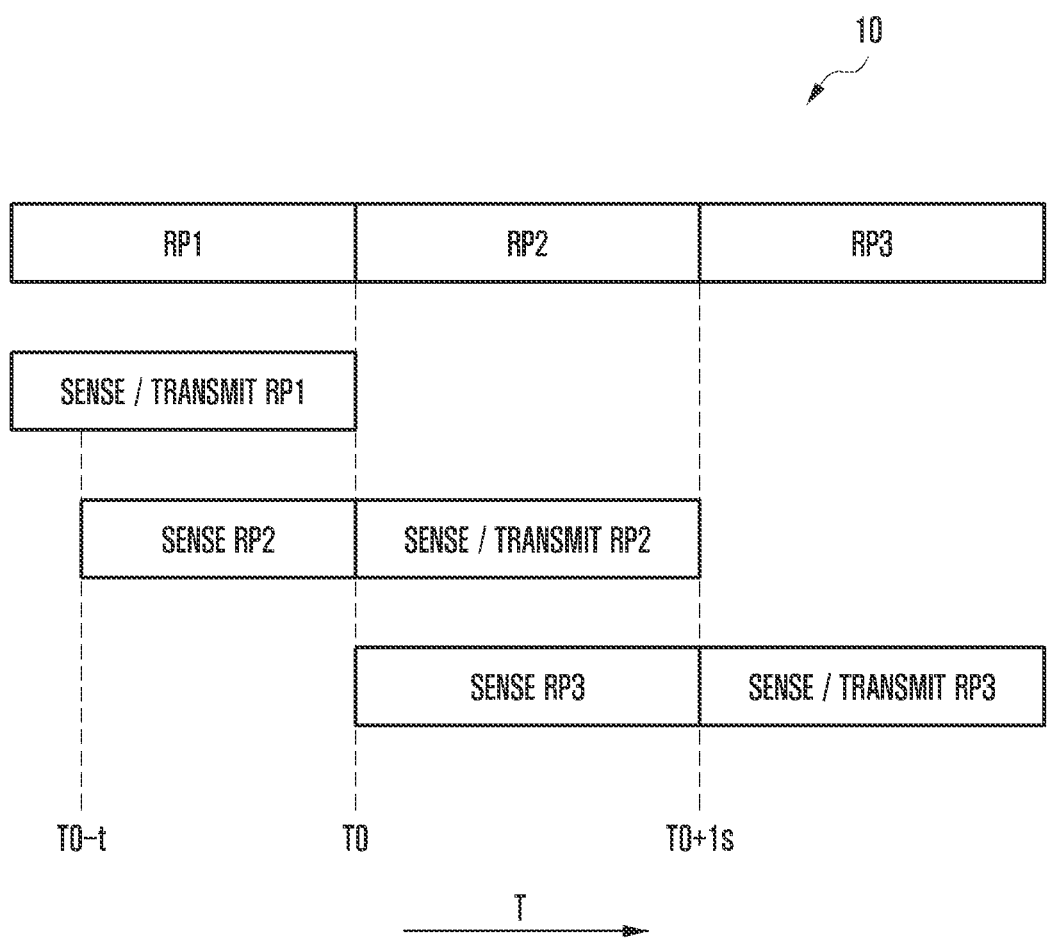
FIG. 8 schematically depicts a method of switching resource pools according to an embodiment of the present disclosure.

FIG. 8 schematically depicts the device 10 according to an embodiment of the present disclosure, in use.

Prior to a time T0−t, the device 10 is arranged to transmit and to sense according to, for example via, a first transmission resource pool RP1. For a time period (i.e., a first time period) from T0−t to T0 (i.e., t s), the device 10 is arranged to sense a second transmission resource pool RP2. In contrast to the device 1, during the time period from T0−t to T0, the device 10 is allowed to use and/or may continue to use, for example sense and/or transmit, according to the first transmission resource pool RP1. In contrast to the device 1, the device 10 is arranged to switch from the first transmission resource pool RP1 to the second transmission resource pool RP2 at the time T0, based on a result of the sensing during the time period from T0−t to T0. During a time period (i.e., a second time period) from T0 to T0+1 s, the device 10 is arranged to use, for example sense and/or transmit, according to the second transmission resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2.

That is, when the device 10 is provided with a new transmission resource pool, such as the transmission resource pool RP2, a transmission interruption before the device 10 may start to transmit via the new transmission resource pool, such as the transmission resource pool RP2, may be reduced, minimized or avoided, in contrast with the device 1. During the time period (i.e., the second time period) from T0 to T0+1 s, the device 10 is arranged to sense a third transmission resource pool RP3. During the time period from T0 to T0+1 s, the device 10 is allowed to use and/or may continue to use, for example sense and/or transmit, according to the second transmission resource pool RP2. The device 10 is arranged to switch from the second transmission resource pool RP2 to the third transmission resource pool RP3 at the time T0, based on a result of the sensing during the time period from T0 to T0+1 s. From the time T0+1 s, the device 10 is arranged to use, for example sense and/or transmit, according to the third transmission resource pool RP3. That is, when the device 10 is provided with another new transmission resource pool, such as the transmission resource pool RP3, a transmission interruption before the device 10 may start to transmit via the new transmission resource pool, such as the transmission resource pool RP3, may be reduced, minimized or avoided, in contrast with the device 1.

That is, for example, a temporary (also known as a fallback or exceptional) transmission resource pool (i.e., the second transmission resource pool RP2) may be provided for use by the device 10 during a time period of potential transmission interruption. Furthermore, the temporary transmission resource pool may be provided early, before the temporary transmission resource pool is required. That is, the device 10 may sense, the temporary transmission resource pool early, before the time period of potential transmission interruption. The temporary transmission resource pool may be continuously configured or provided for use by the device 10, for example, rather than only upon and/or before the switch and/or during the time period of potential transmission interruption. For such continuous configuration, the device 10 may sense the temporary transmission resource pool continuously, for example, periodically, intermittently. Additionally and/or alternatively, for such continuous configuration, the device 10 may sense the temporary transmission resource pool when a resource pool switch or change is expected, for example based on an expected cell change or an expected zone change, as described previously. That is, the device 10 may pre-sense the temporary transmission resource pool.

For example, the first transmission resource pool RP1 may be associated with a current cell, the second transmission resource pool RP2 may be the temporary transmission resource pool provided for use during a HO to a target cell and the third transmission resource pool RP3 may be associated with the target cell.

To ensure consistent performance by devices, such as the device 10, a criterion may define a time (i.e., T–t) when the device 10 is to start sensing the temporary transmission resource pool. For example, for the HO as described above, the criterion may be from when a HO related measurement event criterion is first met. Additionally and/or alternatively, the device 10 may define the criterion, for example, the criterion may be defined by an implementation of the device 10.

Furthermore, use of the temporary transmission resource pool by the device 10 may be defined, for example, restricted, limited or bound.

For example, for the HO as described above, use of the temporary transmission resource pool by the device 10 may be allowed, for example permitted or required, from a time of receiving a HO command until a time of successfully completing the HO.

Additionally and/or alternatively, for the HO as described above, use of the temporary transmission resource pool by the device 10 may be allowed, for example permitted or required, from a time of receiving a HO command until a time of completing sensing of the third transmission resource pool, for example, provided by the target cell.

Additionally and/or alternatively, for the HO as described above, use of the temporary transmission resource pool by the device 10 may be allowed, for example permitted or required, from a time of receiving a HO command until a time of expiry of a T304 HO timer, corresponding with a HO failure.

However, the temporary transmission resource pool may be used by different devices in different zones, potentially resulting in near-far problems. In addition, definition of when the device 10 starts sensing the temporary transmission resource pool may be required, which may be difficult. Furthermore, the temporary transmission resource pool must be allocated, for example, by a cell for this use.

Figure 9:
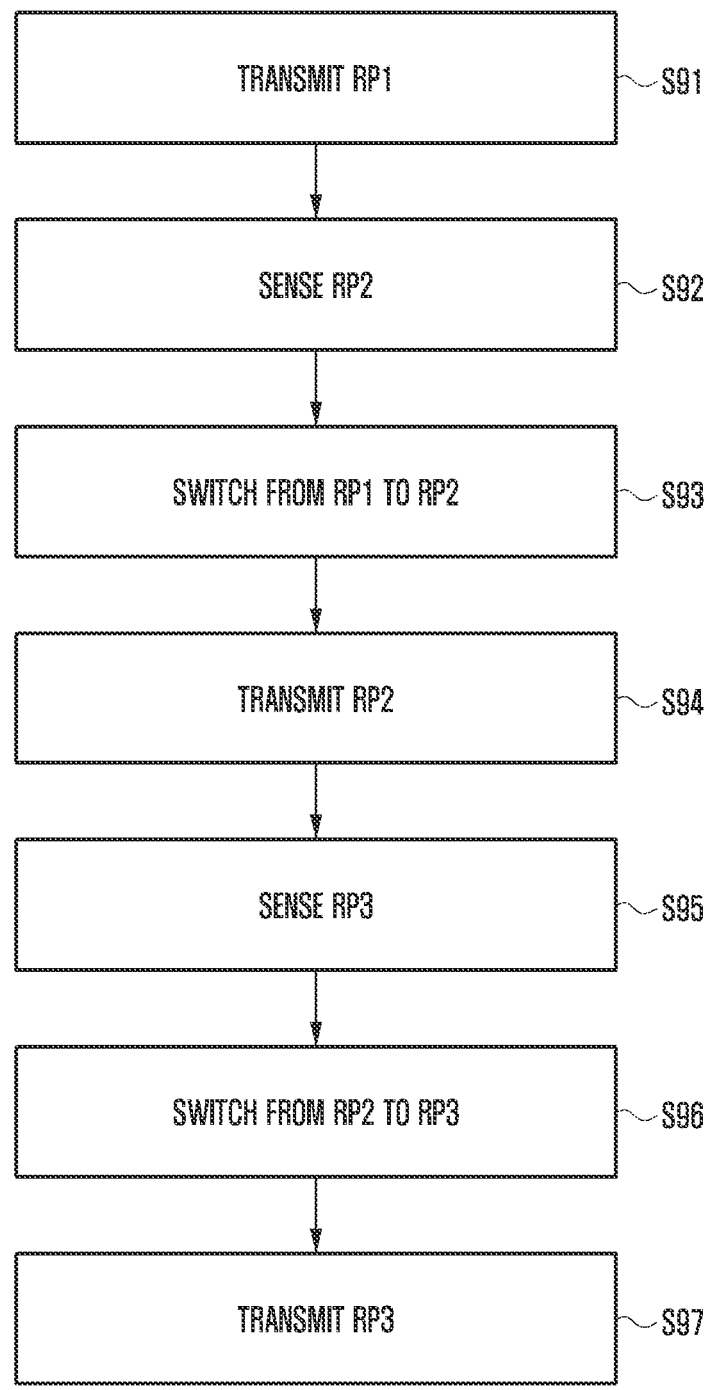
FIG. 9 schematically depicts a device according to an embodiment of the present disclosure, in use.

FIG. 9 schematically depicts a method of switching resource pools according to an embodiment of the present disclosure, the method implemented by the device 10, as described above.

The device 10 is arranged to transmit according to a first resource pool RP1. At S91, the device transmits according to, for example via, the first resource pool RP1. At S92, the device 10 senses a second resource pool RP2. At S93, the device 10 switches from the first resource pool RP1 to the second resource pool RP2, based on a result of the sensing the second resource pool RP2, wherein the device 10 is arranged to transmit according to the second resource pool RP2. At S94, the device 10 transmits according to, for example via, the second resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the method may comprise changing, for the second resource pool RP2, from using random resource selection to using sensing based resource selection based on a result of the sensing the second resource pool RP2. At S95, the device 10 senses a third resource pool RP3. At S96, the device 10 switches from the second resource pool RP2 to the third resource pool RP3, based on a result of the sensing the third resource pool RP3, wherein the device 10 is arranged to transmit according to the third resource pool RP3. At S97, the device 10 transmits according to, for example via, the third resource pool RP3. In this way, transmission interruptions, as described above, may be reduced.

Figure 10:
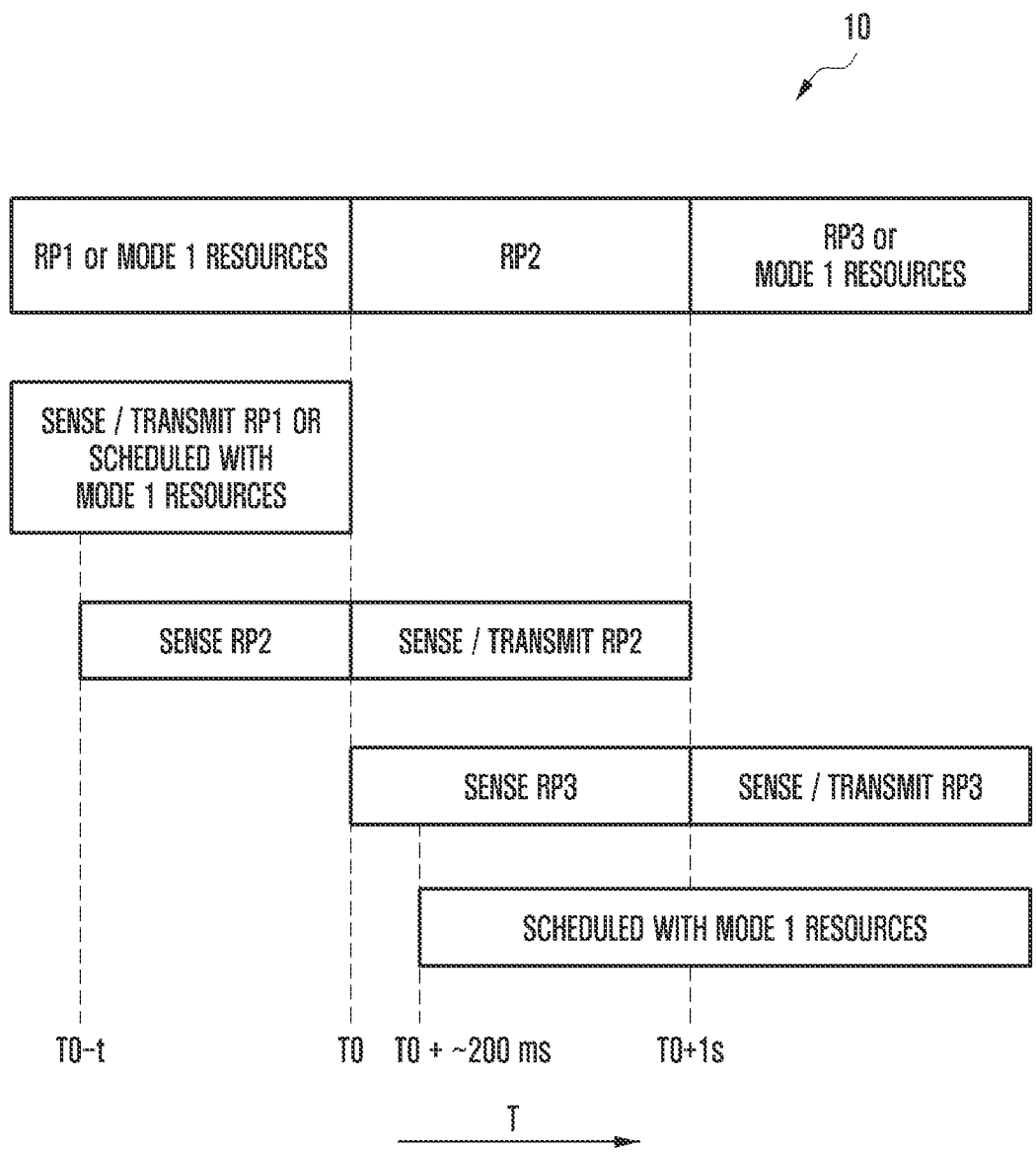
FIG. 10 schematically depicts a method of switching resource pools according to an embodiment of the present disclosure.

FIG. 10 schematically depicts the device 10 according to an embodiment of the present disclosure, in use. FIG. 10 shows two different cases: a first case in which the device 10 is configured with a transmission pool RP3 for use in a target cell and a second case in which a network schedules the transmission resources of the device 10 while connected to the target cell.

For both cases, prior to a time T0–t, the device 10 is arranged to transmit and to sense according to, for example via, a first transmission resource pool RP1 or scheduled Mode 1 resources. For a time period (i.e., a first time period) from T0–t to T0 (i.e., t s), the device 10 is arranged to sense a second transmission resource pool RP2. In contrast to the device 1, during the time period from T0–t to T0, the device 10 is allowed to use and/or may continue to use, for example sense and/or transmit, according to the first transmission resource pool RP1. In contrast to the device 1, the device 10 is arranged to switch from the first transmission resource pool RP1 to the second transmission resource pool RP2 at the time T0, based on a result of the sensing during the time period from T0–t to T0. During a time period (i.e., a second time period) from T0 to T0+1 s, the device 10 is arranged to use, for example sense and/or transmit, according to the second transmission resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2.

That is, when the device 10 is provided with a new transmission resource pool, such as the transmission resource pool RP2, a transmission interruption before the device 10 may start to transmit via the new transmission resource pool, such as the transmission resource pool RP2, may be reduced, minimized or avoided, in contrast with the device 1.

That is, for example, a temporary transmission resource pool (the second transmission resource pool RP2) may be provided for use by the device 10 during a time period of potential transmission interruption. Furthermore, the temporary transmission resource pool may be provided early, before the temporary transmission resource pool is required. That is, the device 10 may sense, the temporary transmission resource pool early, before the time period of potential transmission interruption. The temporary transmission resource pool may be continuously configured or provided for use by the device 10, for example, rather than only upon and/or before the switch and/or during the time period of potential transmission interruption. For such continuous configuration, the device 10 may sense the temporary transmission resource pool continuously, for example, periodically, intermittently. Additionally and/or alternatively, for such continuous configuration, the device 10 may sense the temporary transmission resource pool when a resource pool switch or change is expected, for example based on an expected cell change or an expected zone change, as described previously. That is, the device 10 may pre-sense the temporary transmission resource pool. The temporary transmission resource pool may be an exceptional transmission resource pool, as described herein. The device 10 may perform random selection of the exceptional resource pool, as described herein.

For example, the first transmission resource pool RP1 may be associated with a current cell, the second transmission resource pool RP2 may be the temporary transmission resource pool provided for use during a HO to a target cell, in which either a third transmission resource pool RP3 is used, or in which the network schedules the transmission resources of the UE.

To ensure consistent performance by devices, such as the device 10, a criterion may define a time (i.e., T−t) when the device 10 is to start sensing the temporary transmission resource pool. For example, for the HO as described above, the criterion may be from when a HO related measurement event criterion is first met. Additionally and/or alternatively, the device 10 may define the criterion, for example, the criterion may be defined by an implementation of the device 10.

Furthermore, use of the temporary transmission resource pool by the device 10 may be defined, for example, restricted, limited or bound.

For example, for the HO as described above, use of the temporary transmission resource pool by the device 10 may be allowed, for example permitted or required, from a time of receiving a HO command until a time of successfully completing the HO.

Additionally and/or alternatively, for the HO as described above, use of the temporary transmission resource pool by the device 10 may be allowed, for example permitted or required, from a time of receiving a HO command until a time of completing sensing of the third transmission resource pool, for example, provided by the target cell.

Additionally and/or alternatively, for the HO as described above, use of the temporary transmission resource pool by the device 10 may be allowed, for example permitted or required, from a time of receiving a HO command until a time of expiry of a T304 HO timer, corresponding with a HO failure.

However, the temporary transmission resource pool may be used by different devices in different zones, potentially resulting in near-far problems. In addition, definition of when the device 10 starts sensing the temporary transmission resource pool may be required, which may be difficult. Furthermore, the temporary transmission resource pool must be allocated, for example, by a cell for this use.

For the first case, during the time period (i.e., the second time period) from T0 to T0+1 s, the device 10 is arranged to sense a third transmission resource pool RP3. During the time period from T0 to T0+1 s, the device 10 is allowed to use and/or may continue to use, for example sense and/or transmit, according to the second transmission resource pool RP2. The device 10 is arranged to switch from the second transmission resource pool RP2 to the third transmission resource pool RP3 at the time T0, based on a result of the sensing during the time period from T0 to T0+1 s. From the time T0+1 s, the device 10 is arranged to use, for example sense and/or transmit, according to the third transmission resource pool RP3. That is, when the device 10 is provided with another new transmission resource pool, such as the transmission resource pool RP3, a transmission interruption before the device 10 may start to transmit via the new transmission resource pool, such as the transmission resource pool RP3, may be reduced, minimized or avoided, in contrast with the device 1.

For the second case, additionally and/or alternatively, for example after completion of HO to the target cell, the device 10 may be scheduled with Mode 1 resources from a time T0+~200 ms. That is, during handover, the network may be temporarily unable to schedule transmission resources and it may take ~200 ms for the handover procedure to complete successfully.

Figure 11:
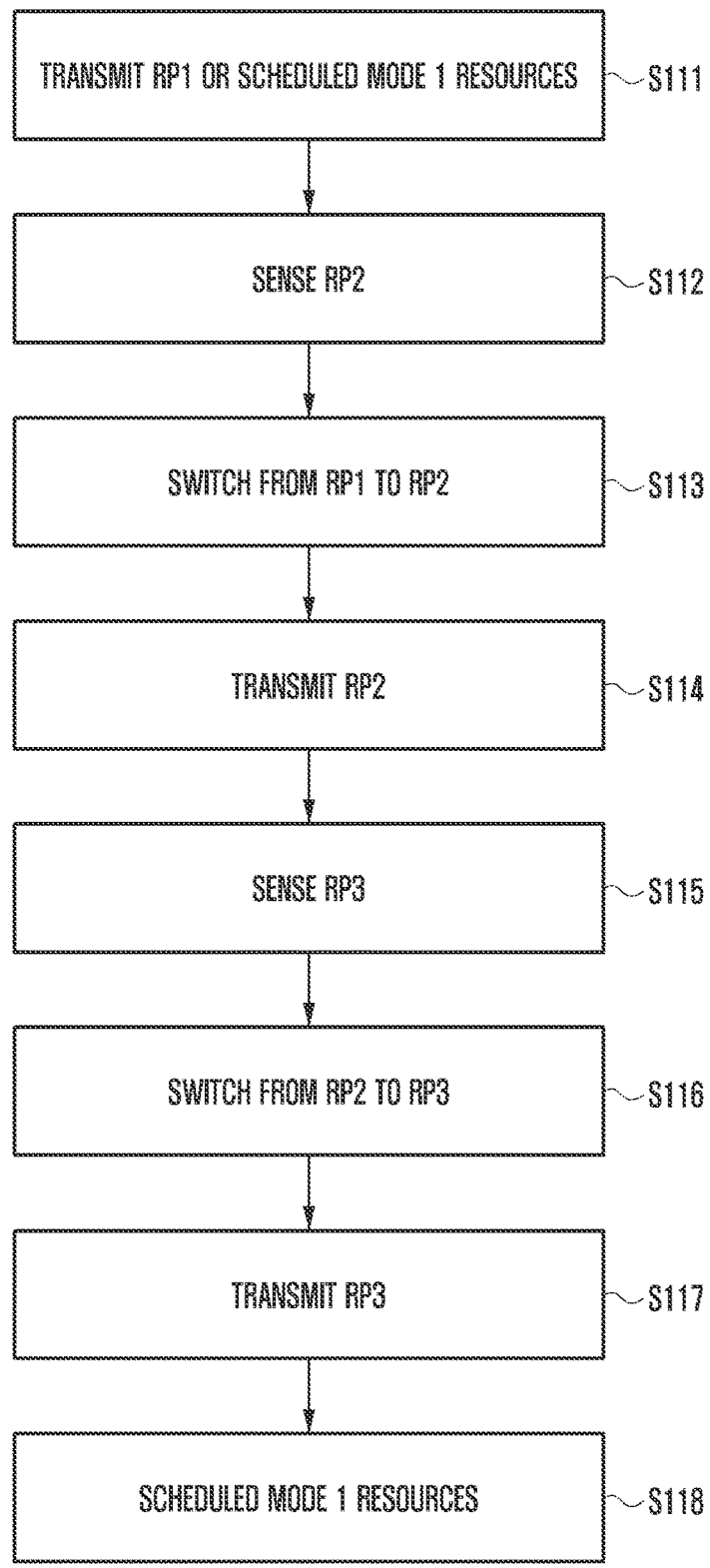
FIG. 11 schematically depicts a device according to an embodiment of the present disclosure, in use.

FIG. 11 schematically depicts a method of switching resource pools according to an embodiment of the present disclosure, the method implemented by the device 10, as described above.

The device 10 is arranged to transmit according to a first resource pool RP1. At S111, the device transmits according to, for example via, the first resource pool RP1 or scheduled Mode 1 resources. At S112, the device 10 senses a second resource pool RP2. At S113, the device 10 switches from the first resource pool RP1 to the second resource pool RP2, based on a result of the sensing the second resource pool RP2, wherein the device 10 is arranged to transmit according to the second resource pool RP2. At S114, the device 10 transmits according to, for example via, the second resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the method may comprise changing, for the second resource pool RP2, from using random resource selection to using sensing based resource selection based on a result of the sensing the second resource pool RP2. At S115, the device 10 senses a third resource pool RP3 if not configured with Mode 1 (in which resources are not scheduled by the network). At S116, the device 10 switches from the second resource pool RP2 to the third resource pool RP3, based on a result of the sensing the third resource pool RP3, wherein the device 10 is arranged to transmit according to the third resource pool RP3 if not configured with Mode 1 resources. At S117, the device 10 transmits according to, for example via, the third resource pool RP3 if not configured with Mode 1 resources. At S118, the device transmits according to, for example via, the scheduled Mode 1 resources. In this way, transmission interruptions, as described above, may be reduced.

Figure 12:
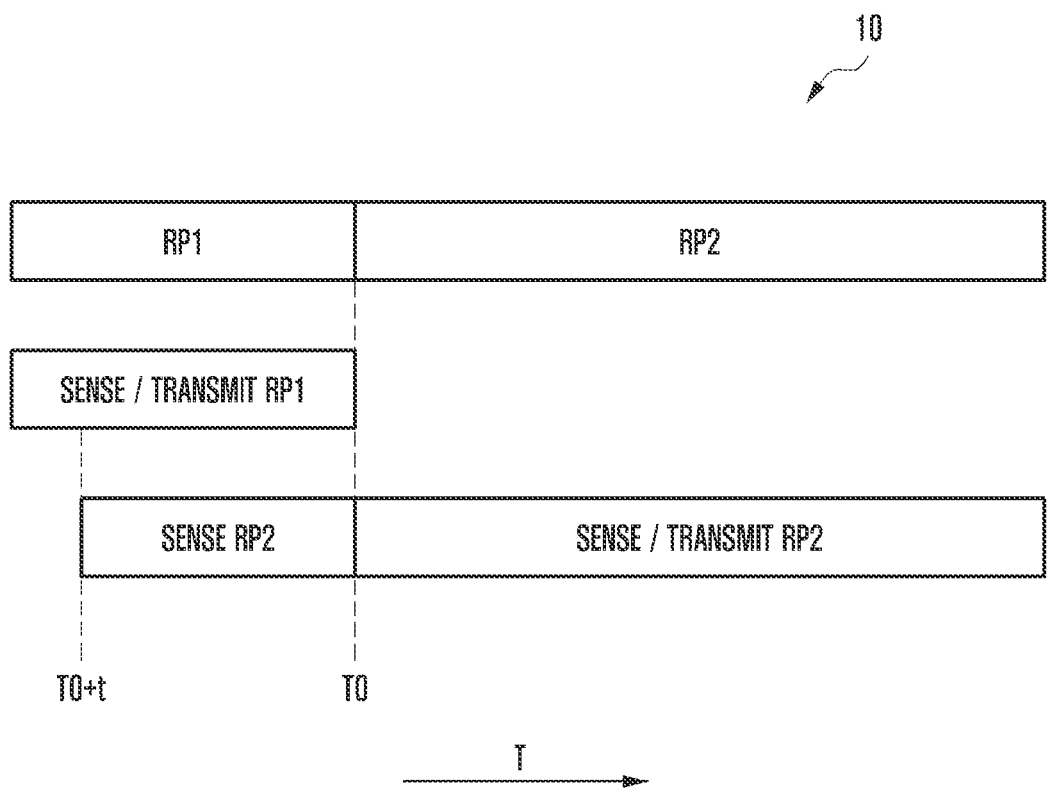
FIG. 12 schematically depicts a method of switching resource according to an embodiment of the present disclosure.

FIG. 12 schematically depicts the device 10 according to an embodiment of the present disclosure, in use.

Prior to a time T0–t, the device 10 is arranged to transmit and to sense according to, for example via, a first transmission resource pool RP1. For a time period (i.e., a first time period) from T0–t to T0 (i.e., t s), the device 10 is arranged to sense a second transmission resource pool RP2. In contrast to the device 1, during the time period from T0–t to T0, the device 10 is allowed to use and/or may continue to use, for example sense and/or transmit, according to the first transmission resource pool RP1. In contrast to the device 1, the device 10 is arranged to switch from the first transmission resource pool RP1 to the second transmission resource pool RP2 at the time T0, based on a result of the sensing during the time period from T0–t to T0. From the time T0, the device 10 is arranged to use, for example sense and/or transmit, according to the second transmission resource pool RP2. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2.

That is, when the device 10 is provided with another new transmission resource pool, such as the transmission resource pool RP2, a transmission interruption before the device 10 may start to transmit via the new transmission resource pool, such as the transmission resource pool RP2, may be reduced, minimized or avoided, in contrast with the device 1.

That is, the device 10 is arranged to start sensing the second transmission resource pool RP2 relatively early, compared with the device 1, prior to the switch of the device 10 from the first transmission resource pool RP1 to the second transmission resource pool RP2 at the time T0. Furthermore, if sensing is completed before the time T0, which may be considered an intended switching point, the device 10 may be arranged to switch when sensing is completed, for example, before the time T0. In this way, an optimal transmission resource pool, such as the second transmission resource pool RP2, may be used as early as possible, for example, reducing and/or minimizing near-far problems.

The device 10 may require information related to the second transmission resource pool relatively early, for example, before T0 or before T0–t. Furthermore, the device 10 may require a criterion indicating from when the device 10 should start sensing the second transmission resource pool.

Figure 13:
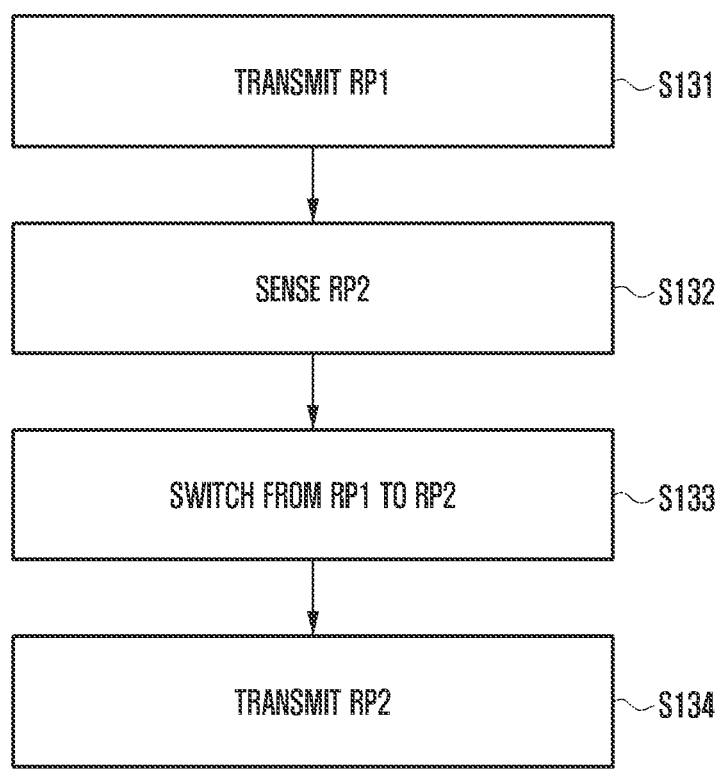
FIG. 13 schematically depicts a device according to an embodiment of the present disclosure, in use.

FIG. 13 schematically depicts a method of switching resource pools according to an embodiment of the present disclosure, the method implemented by the device 10, as described above.

The device 10 is arranged to transmit according to a first resource pool RP1. At S131, the device transmits according to, for example via, the first resource pool RP1. At S132, the device 10 senses a second resource pool RP2. At S133, the device 10 switches from the first resource pool RP1 to the second resource pool RP2, based on a result of the sensing the second resource pool RP2, wherein the device 10 is arranged to transmit according to the second resource pool RP2. At S134, the device 10 transmits according to, for example via, the second resource pool RP2. In this way, transmission interruptions, as described above, may be reduced. Switching from the first resource pool RP1 to the second resource pool RP2 may comprise: determining if the second resource pool RP2 has been sensed sufficiently long to apply sensing based resource selection; and based on a result of the determining: using sensing based resource selection if the second resource pool RP2 has been sensed sufficiently long to apply sensing based resource selection; and using random resource selection for the second resource pool RP2 if the second resource pool RP2 has not been sensed sufficiently long to apply sensing based resource selection. If switching from the first resource pool RP1 to the second resource pool RP2 comprises using random resource selection for the second resource pool RP2, the device 10 may be arranged to change, for the second resource pool RP2, from using random resource selection to using sensing based resource selection based on a result of the sensing the second resource pool RP2.

Figure 14:
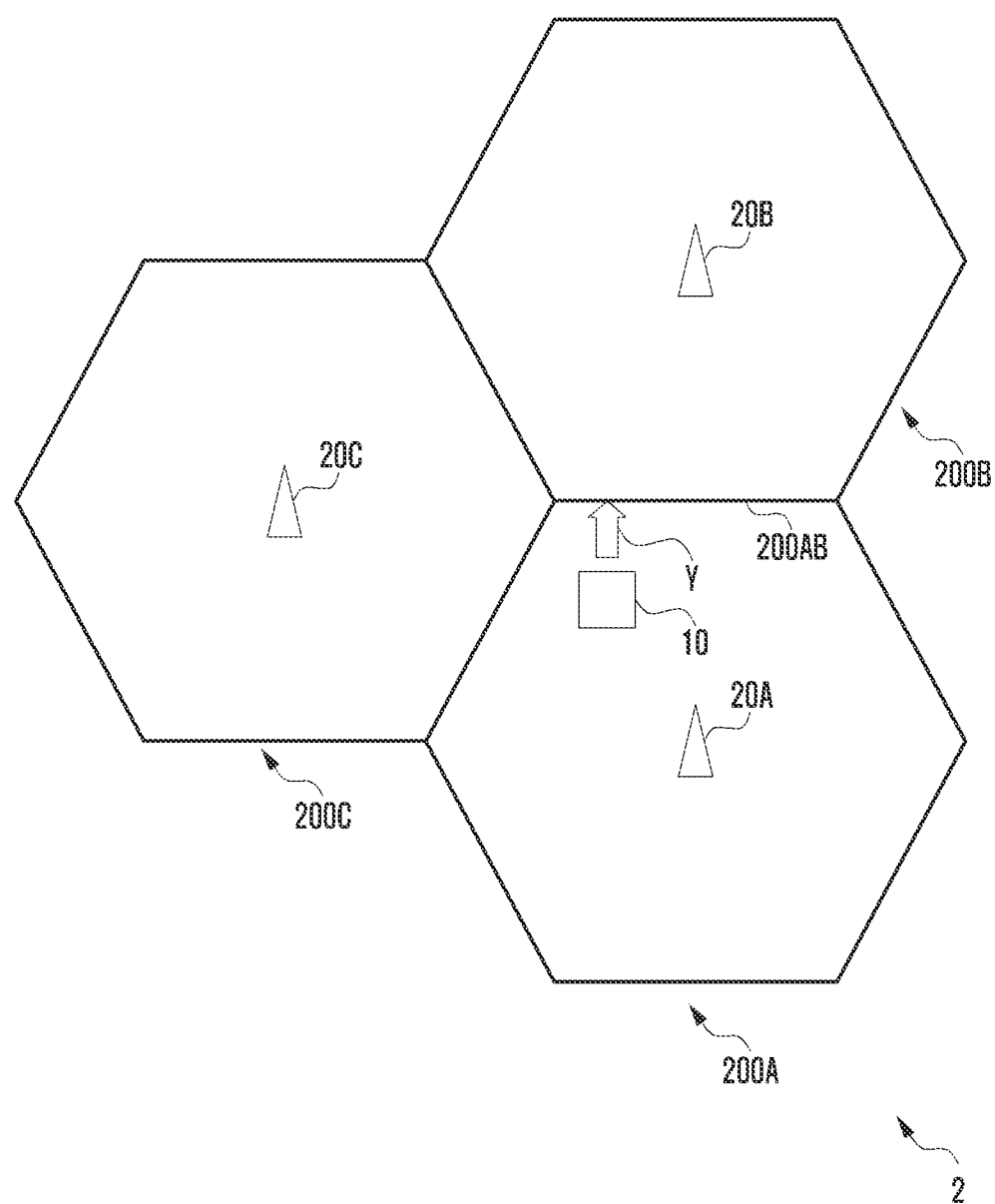
FIG. 14 schematically depicts a device according to an embodiment of the present disclosure, in use.

FIG. 14 schematically depicts the device 10 according to an embodiment of the present disclosure, in use.

In detail, FIG. 14 shows a network 2 comprising three cells 200A, 200B, 200C, defined by APs 20A, 20B and 20C, respectively. The APs 20 may be eNBs, for example. The cells 200 define in-coverage, out-of-coverage and partial coverage situations, as described previously. The cells 200 are shown as hexagonal cells, for convenience. A border 200AB between the cell 200A and the adjacent cell 200B is oriented in an X direction.

The device 10 is in the cell 200A (i.e., a current cell) and is moving towards the border 200AB with the adjacent cell 200B (i.e., a target cell) in a direction Y, transverse to the border 200AB. The device 10 is arranged to transmit according to the first resource pool RP1, as described previously, in which the first resource pool RP1 is allocated by the cell 200A.

The device 10 may determine the current cell 200A according to a location of the device 10 and cell information received from the AP 20A. Additionally, the device 10 may determine the adjacent, target cell 200B, as described previously. The device 10 may also determine that the border 200AB of the current cell will be and/or is being and/or has been crossed. That is, the device 10 may determine a cell change or an expected cell change, for example from the current cell 200A to the target cell 200B.

In response to the determination of the cell change, as described above, the device 10 may switch resource pools, as described previously with respect to FIGS. 6 and 7. That is, the device 10 may continue to use the first transmission resource pool RP1 within the target cell 200B until sensing of the second resource pool RP2, allocated by the target cell 200B, is complete, for example. That is, the switch of the device 10 from the first transmission resource pool RP1 to the second transmission resource pool RP2 may be considered to be delayed with respect to the switch of the device 1, as described above. In this way, a transmission interruption, as described above, may be reduced.

In response to the determination of the expected cell change, as described above, the device 10 may pre-sense one or more second resource pools, for example, one or more candidate target transmission resource pools allocated by the target cell 200B. Additionally and/or alternatively, the device 10 may sense one or more reception resource pools, as described previously. Additionally and/or alternatively, the device 10 may sense a temporary resource pool, as described previously.

In response to the determination of the cell change, as described above, the device 10 may switch resource pools, as described previously with respect to FIGS. 8 and 9. The device 10 may receive information related to the second resource pool RP2, which may be the temporary resource pool, before crossing the border 200AB, for example. That is, the device 10 may sense the second resource pool RP2 relatively early, for example, while moving towards and/or before crossing the border 200AB. After crossing the border 200AB and/or within the cell 200B, the device 10 may receive information related to a third resource pool, allocated by the cell 200B, and/or switch to the third resource pool RP3, or be scheduled with Mode 1 resources, as described previously. In this way, a transmission interruption, as described above, may be reduced.

In response to the determination of the cell change, as described above, the device 10 may switch resource pools early, as described previously with respect to FIGS. 12 and 13. The device 10 may receive information related to the second resource pool RP2 before crossing the border 200AB, for example, in a handover (HO) command That is, the device 10 may sense the second resource pool RP2, allocated by the cell 200B, relatively early, for example, while moving towards and/or before crossing the border 200AB. In this way, a transmission interruption, as described above, may be reduced.

In response to the determination of the cell change, as described above, the device 10 may switch resource pools early, as described previously with respect to FIGS. 12 and 13. The device 10 may sense one or more reception resource pools, as described previously. That is, the device 10 may sense the second resource pool RP2, corresponding to the one or more reception resource pools, relatively early, for example, while moving towards and/or before crossing the border 200AB. In this way, a transmission interruption, as described above, may be reduced.

The device 10 may switch based on the result of the sensing and determining the cell change. That is, a trigger to switch from the first resource pool RP1 to the second resource pool RP2 may be the result of the sensing and determining the cell change.

Alternatively, the device 10 may switch based on the result of the sensing and a command received, for example, from the AP 20A. That is, a trigger to switch from the first resource pool RP1 to the second resource pool RP2 may be the result of the sensing and the command.

In response to the determination of the cell change, as described above, additionally and/or alternatively, the device 10 may not switch from the first resource pool RP1 to the second resource pool RP2. For example, the device 10 may receive information indicating that the second resource pool RP2 is the same as the first resource pool RP1. That is, the first resource pool RP1 allocated by the cell 200A may be the same as the second resource pool RP2 allocated by the cell 200B.

Particularly, there may be two examples related to information received by the device before a handover (HO).

In a first example, zones may not be defined and/or used. Thus, it is unlikely that neighboring or target cells use the same transmission resource pool as the current cell. In this example, the device 10 would need to receive information about transmission resource pools of all neighbor in cells. Alternatively, the device 10 would need to receive information about a general broader resource pool covering transmission resource pools of neighboring cells, for example, the device may use the reception resource pools of which it already has all the required information.

In a second example, zones may be defined and/or used. In this case, it would be beneficial if the network would indicate that the zone based pool configuration continues unchanged across the border of neighboring cells, for example by a single bit as described previously (i.e., the bit indicating that the first resource pool continues across a cell border).

Additionally and/or alternatively, for cell change in idle mode, the bit may be included in SIB21 indicating whether neighboring cells employ the same zone based transmission pool configuration. If the bit is set, the device may employ a pre-sensing operation in advance of a zone change, for example, as for a case of intra-cell. This option may be used in conjunction with wherein the device is configured to use a normal pool, for example a source pool or the first resource pool, for example included in SIB21, wherein the device has not performed sensing for a required duration, for example following cell re-selection, wherein the device is configured to use the second resource pool, for example included in SIB21, with random selection. In this way, use of the second resource pool (with random selection) may be controlled and/or reduced and/or minimized.

In an example embodiment, a bit, for example in SIB21, indicates whether a neighboring cell and/or a plurality of neighboring cells employ a same zone based transmission pool configuration.

Figure 15:
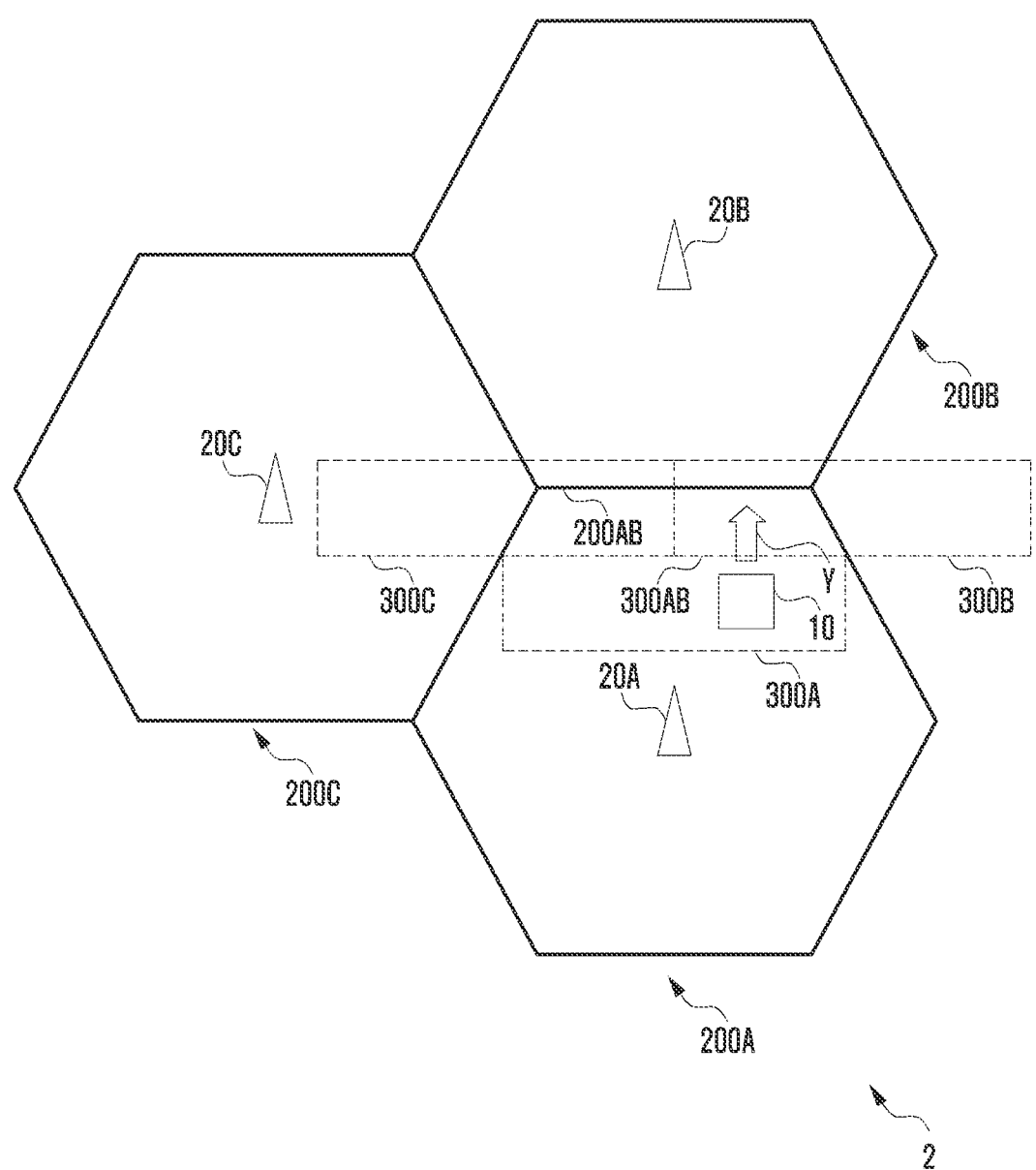
FIG. 15 schematically depicts a device according to an embodiment of the present disclosure, in use.

FIG. 15 schematically depicts the device 10 according to an embodiment of the present disclosure, in use.

In detail, FIG. 15 shows the network 2 comprising the three cells 200A, 200B, 200C, defined by the APs 20A, 20B and 20C, respectively, as described previously with respect to FIG. 14. In addition, three rectangular, contiguous zones 300A, 300B, 300C are shown. The zone 300A is partly within the cell 200A and partly in an out-of-coverage area. The zone 300B is partly within the two cells 200A and 200B and partly in an out-of-coverage area. The zone 300C is partly within the three cells 200A, 200B and 200C. A border 300AB between the zone 300A and the adjacent zone 300B is oriented in an X direction, partly within the cell 200A and partly in an out-of-coverage area.

The device 10 is in the cell 200A (i.e., the current cell) and is moving towards the border 200AB with the adjacent cell 200B (i.e., the target cell) in a direction Y, transverse to the border 200AB, as described previously. The device 10 is arranged to transmit according to the first resource pool RP1, as described previously, in which the first resource pool RP1 is allocated by the cell 200A.

The device 10 is also in the zone 300A (i.e., a current zone) and is moving towards the border 300AB with the adjacent zone 300B (i.e., a target zone) in a direction Y, transverse to the border 300AB. The device 10 is relatively more proximal the border 300AB than the border 200AB.

The device 10 may determine the current cell 200A according to the location of the device 10 and cell information received from the AP 20A, as described previously.

Additionally, the device 10 may determine the current zone 300A according to the location of the device 10 and zone information received from the AP 20A and/or zone information received previously, for example during setup or updating, as described previously. The device 10 may also determine the adjacent, target zone 300B, as described previously. The device 10 may also determine that the border 300AB of the current zone will be and/or is being and/or has been crossed. That is, the device 10 may determine a zone change or an expected zone change, for example from the current zone 300A to the target zone 300B.

In response to the determination of the zone change, as described above, the device 10 may switch resource pools, as described previously with respect to FIGS. 5 and 6. That is, the device 10 may continue to use the first transmission resource pool RP1 within the target zone 300B until sensing of the second resource pool RP2, allocated for the target zone 300B, is complete, for example. That is, the switch of the device 10 from the first transmission resource pool RP1 to the second transmission resource pool RP2 may be considered to be delayed with respect to the switch of the device 1, as described above. In this way, a transmission interruption, as described above, may be reduced.

In response to the determination of the expected zone change, as described above, the device 10 may pre-sense one or more second resource pools, for example, one or more candidate target transmission resource pools allocated for the current zone 300A. It should be noted that, based on the resource configuration information acquired or received upon entering cell 200A, the device 10 in the zone 300A is typically made aware of the second resource pool RP2 used in the zone 300B. Hence, in particular, the device 10 may start sensing the second resource pool RP2 upon determining that the device 10 is approaching the zone 300B. Additionally and/or alternatively, the device 10 may sense one or more reception resource pools, as described previously. Additionally and/or alternatively, the device 10 may sense a temporary resource pool, as described previously.

In response to the determination of the zone change, as described above, the device 10 may switch resource pools, as described previously with respect to FIGS. 7 and 8. The device 10 may receive information related to the second resource pool RP2, which may be the temporary resource pool, before crossing the border 300AB, for example. That is, the device 10 may sense the second resource pool RP2 relatively early, for example, while moving towards and/or before crossing the border 300AB. After crossing the border 300AB and/or within the zone 300B, the device 10 may receive information related to the third resource pool, allocated for the zone 300B, and/or switch to the third resource pool RP3, as described previously. In this way, a transmission interruption, as described above, may be reduced.

In response to the determination of the zone change, as described above, the device 10 may switch resource pools early, as described previously with respect to FIGS. 11 and 12. The device 10 may receive information related to the second resource pool RP2 before crossing the border 300AB, for example, from the AP 20A. That is, the device 10 may sense the second resource pool RP2, allocated by the cell 200A for the zone 300A, relatively early, for example, while moving towards and/or before crossing the border 300AB. In this way, a transmission interruption, as described above, may be reduced.

In response to the determination of the zone change, as described above, the device 10 may switch resource pools early, as described previously with respect to FIGS. 11 and 12. The device 10 may sense one or more reception resource pools, as described previously. That is, the device 10 may sense the second resource pool RP2, corresponding to the one or more reception resource pools, relatively early, for example, while moving towards and/or before crossing the border 300AB. In this way, a transmission interruption, as described above, may be reduced.

The device 10 may switch based on the result of the sensing and determining the zone change. That is, a trigger to switch from the first resource pool RP1 to the second resource pool RP2 may be the result of the sensing and determining the zone change.

A particular case of interest is when the device 10 moves from the zone 300B in the cell 200A to the cell 200B i.e., crossing the cell border 200AB. In response to the determination of the cell change or the expected cell change, i.e., from the cell 200A to the cell 200B, additionally and/or alternatively, the device 10 may not switch from the first resource pool RP2 to the second resource pool RP3. For example, the device 10 may receive information indicating that the zone based resource configuration used by the cell 200B is the same as used by the cell 200A (i.e., continues across the cell border 200AB). Such indication implies that the resource pool used in the zone 300B is the same on both sides of the cell border 200AB, i.e., does not change upon changing cell. Moreover, if the zone border 300AB were approximately coincident with the cell border 200AB, the bit indicating that the zone based resource configuration continues across the cell border 200AB would enable the device 10 to know the resource pool used in the zone 300B (and hence which resources to pre-sense).

FIG. 16 shows relevant broadcast signaling as may be included in a system information block (SIB), such as SIB18. In detail, FIG. 16 shows a number of existing fields that are relevant for this present disclosure, i.e., commRx-Pool-r12 161, commTxPoolNormalCommon-r12 162, commTxPoolExceptional-r12 163 and commTxPoolNormal-CommonExt-r13 164 as well as some extensions that would be introduced in accordance with the proposals in this present disclosure: neighCellTxInfoList-r14 165 and neighCellCommTxPoolSame-r14 166.

FIGS. 17A and 17B shows relevant dedicated signaling as may be included in a dedicated message, such as RRCConnectionReconfiguration according to an embodiment of the present disclosure. In detail, FIGS. 17A and 17B shows an existing field sl-CommConfig-r12 171, as well as some extensions that would be introduced in accordance with the proposals in this present disclosure: neighCellTxInfoList-r14 172 and neighCellCommTxPoolSame-r14 173.

Figure 18:
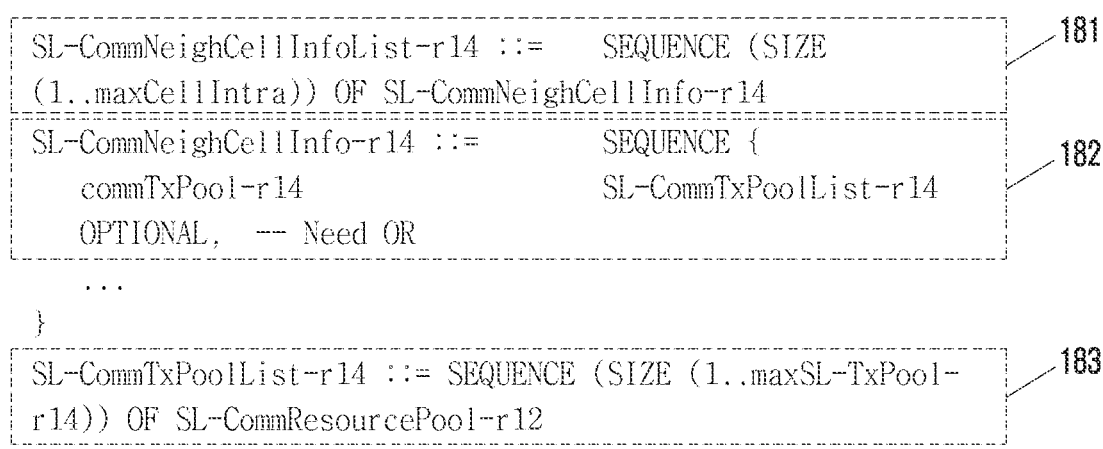
FIG. 18 schematically depicts signaling extensions for an embodiment of the present disclosure.

FIG. 18 shows extensions that may be used in both broadcast and dedicated signaling according to an embodiment of the present disclosure. In detail, FIG. 18 shows an extension SL-CommNeighCellInfoList-r14 181, an extension SL-CommNeighCellInfo-r14 182 and an extension SL-CommTxPoolList-r14 183.

Particularly, upon expecting cell change, the device 10 may pre-sense the second resource pool:

a) The second resource pool may be indicated by a reception resource pool (i.e., a broader pool covering transmission resources used by nearby devices in neighboring cells, using transmission resources of such cells). In both idle and connected states, the device may use the communication reception resource pool provided by broadcast signaling, for example included in SIB18 as field 161 (commRxPool-r12). It may however be that a V2X specific reception pool is provided, possibly within another SIB.

b) The second resource pool may be the transmission pool used by the expected/candidate target cell(s). For this option, the device needs to be informed about the details of the transmission resource pools of all neighbor cells. To support this case for use by devices that are in an idle state, E-UTRAN needs to provides the neighboring information (i.e., the transmission resource pool of neighbors) in SIB18. Although provision of information of neighboring cells on other frequencies should not be excluded, it may be less attractive given a signaling overhead. As an example, the extensions 165, 172 (neighCellTxInfoList-r14) and/or the extension 181 (SL-CommNeighCellInfoList-r14) included in SIB18 may thus only cover intra-frequency neighbors. The same extension may be used in a connected state. Alternatively and/or additionally, the neighboring information may be added to dedicated signaling, for example the field 171 (SL-CommConfig-r12). The extensions 165, 172 (neighCellTxInfoList-r14) and/or the extension 181 (SL-CommNeighCellInfoList-r14) may be the same, and may for example again only cover intra-frequency neighbors.

c) If zones are used, the network may indicate that in neighboring cells the zone based pool configuration continues unchanged. In such case, the transmission resources to be used by the device only change upon change of zone, but not necessarily upon change of cell. In such case, upon cell change the UE only needs to use another transmission pool if a zone border coincides with the cell border, for example. The UE can, from the zone based pool configuration, always determine the transmission pool used by the expected target zone. Hence, if the network indicates that the same zone based pool configuration continues in neighboring cells, the UE can also determine the transmission pool to be used in such neighboring cells beforehand (e.g., before it actually changes to such cells). For the same or similar reasons as indicated for b), the indication may for example be included in SIB18. It may however also be included elsewhere for example should a V2X specific reception pool is specified within another SIB. Although it may be unlikely that same resource configuration is used on other frequencies, provision of an indicator for other frequencies need not be excluded. As an example, the SIB18 extension 166 (neighCellCommTxPoolSame-r14) only covers intra-frequency neighbors. The same extension may be used for devices in connected states. Alternatively and/or additionally, the neighboring information may be added to dedicated signaling, for example, by the RRCConnectionReconfiguration extension 173 (SL-CommConfig-r12). The extension 166, 173 (neighCellCommTxPoolSame-r14) may be the same and may for example again only cover intra-frequency neighbors.

Although a preferred embodiment has been shown and described, it will be appreciated by those skilled in the art that various changes and modifications might be made without departing from the scope of the present disclosure, as defined in the appended claims and as described above.

In summary, the present disclosure provides a method of switching resource pools, implemented on a device. The present disclosure also provides the device. The device is arranged to transmit according to a first resource pool. A second resource pool is sensed. The device switches from the first resource pool to the second resource pool, based on a result of the sensing. Switching from the first resource pool to the second resource pool may comprise: determining if the second resource pool has been sensed sufficiently long to apply sensing based resource selection; and based on a result of the determining: using sensing based resource selection if the second resource pool has been sensed sufficiently long to apply sensing based resource selection; and using random resource selection for the second resource pool if the second resource pool has not been sensed sufficiently long to apply sensing based resource selection. If switching from the first resource pool to the second resource pool comprises using random resource selection for the second resource pool, the device may be arranged to change, for the second resource pool, from using random resource selection to using sensing based resource selection based on a result of the sensing the second resource pool. By switching in this way, the device is arranged to transmit according to the second resource pool and transmission interruptions associated with switching resource pools may be reduced or avoided according to the related art.

In this way, the device may, for example, transmit data according to, for example via or using, the first resource pool. In parallel, simultaneously, concurrently or interleavingly to transmitting, the device may also sense the second resource pool. The device may switch, for example directly, indirectly, conditionally, subsequently, autonomously or in response to a request, to the second resource pool, based on a result of the sensing or using random resource selection of the second resource pool. By switching, for example reconfiguring, changing, swapping, exchanging, migrating or moving, from the first resource pool to the second resource pool, the device may be arranged to transmit according to, for example via or using, the second resource pool. In this way, the device may, for example, transmit data according to the arranged, for example newly-arranged, second resource pool.

By sensing the second resource pool while transmitting according to the first resource pool and switching from the first resource pool to the second resource pool after sensing the second resource pool and switching subsequently after sensing the second resource pool, latency and/or interruption of transmission arising from switching, for example, may be reduced or avoided. In this way, a QoS may be improved such that, for example, compromise of safety critical systems may be lowered or averted according to the related art.

In other words, the present disclosure may provide an improved method of and apparatus for switching resource pools. Particularly, by sensing the second resource pool while transmitting according to the first resource pool and switching from the first resource pool to the second resource pool after sensing the second resource pool and switching subsequently after sensing the second resource pool, latency and/or interruption of transmission arising from switching, for example, may be reduced or avoided. In this way, a QoS may be improved such that, for example, compromise of safety critical systems may be lowered or averted. In this way, a transmission interruption that may arise in various scenarios, as described above, may be overcome according to the related art.

In the first scenario, related to a cell change (cell reselection or handover, HO), the device 10 is configured with a first transmission resource pool RP1 in a source cell. During change from the source cell to a target cell, the device 10 is configured with a second transmission resource pool RP2, for use in the target cell. As described above, by sensing the second resource pool RP2 while transmitting according to the first resource pool RP1 and switching from the first resource pool RP1 to the second resource pool RP2 after sensing the second resource pool, the transmission interruption of 1 s arising from switching, for example, may be reduced or avoided according to the related art.

In the second scenario, related to a cell change (cell re-selection or handover, HO), the device 10 is configured with a first transmission resource pool RP1 in a source cell. During change from the source cell to a target cell, the device 10 is configured with a second transmission resource pool RP2, for use, during the cell change. As described above, the first transmission interruption of 1 s may be similarly reduced or avoided. Subsequently, the device 10 is configured with a third transmission resource pool RP3, for use, during in the target cell. As described above, the second transmission interruption of 1 s may be similarly reduced or avoided.

In the third scenario, related to a zone change, the device 10 is required to use a first transmission resource pool RP1 in a first zone, prior to a time T0, as described above. Due to a mobility of the device 10, the device 10 is required to use a second transmission resource pool RP2 in an adjacent second zone, after the time T0, as described above. As described above, the transmission interruption of 1 s may be similarly reduced or avoided.

In the fourth scenario, related to a state transition, the device 10 is supposed to use a first transmission resource pool RP1 in an IDLE state, prior to a time T0, as described above. Due to a state transition of the device 10, the device 10 is required to change to a second transmission resource pool RP2, with dedicated signaling, in a CONNECTED state, after the time T0, as described above. As described above, the transmission interruption of 1 s may be similarly reduced or avoided.

Additionally and/or alternatively, the device 10 may be configured to use an exceptional transmission pool (i.e., a second resource pool) using random resource selection if the device 10 has not completed sensing-based resource selection, as described above. For example, the device 10 may be configured to use the exceptional transmission pool during connection establishment, RLF and/or Radio Resource Control (RRC) reselection. The device 10 may pre-sense the exceptional transmission pool.

Additionally and/or alternatively, the device 10 may be configured to use the first transmission resource pool RP1 (i.e., a normal transmission pool) in the IDLE state and/or if there is no Primary Serving Cell (PCell). However, if the device 10 has not performed sensing for sufficiently long so as to use sensing-based resource selection for the normal pool, for example a source pool or the first resource pool RP1, the device 10 may instead use the exceptional transmission pool. The exceptional transmission pool may be in SIB21. The device 10 may use the exceptional transmission pool with random resource selection. The device 10 may pre-sense the exceptional transmission pool.

In this way, by using the exceptional transmission pool, sensing-based pools may not be polluted or interfered with random resource selection. That is, only the exceptional transmission pool would be polluted or interfered with random resource selection. Furthermore, pool sizes may be controlled and/or reduced and/or minimized. For example, random resource selection may require a relatively larger pool so as to provide similar and/or the same performance as sensing-based resource selection. By limiting random resource selection to one pool (i.e., the exceptional transmission pool), a size of this exceptional transmission pool only may be relatively larger and/or increased while resource transmission pools associated with zones may be relatively smaller and/or reduced. Particularly, the resource transmission pools associated with the zones may be numerous and thus these numerous zones may be each relatively smaller and/or reduced compared with the single exceptional transmission pool.

In the fifth scenario, related to moving out of coverage, the device 10 is required to use a first transmission resource pool RP1 in a first zone, prior to a time T0, as described above. Due to a mobility of the device 10 in which the device 10 moves out of coverage of the first zone, the device 10 is required to use a second transmission resource pool RP2, after the time T0, as described above. That is, this scenario related to moving out of coverage may be considered covered by and/or similar to and/or the same as the scenario related to a zone change, as described above. Particularly, when moving out of coverage from the first zone, the device 10 may estimate a second zone (i.e., a target zone) towards which the device 10 is moving and start pre-sensing corresponding resources of the second zone (i.e., the second transmission resource pool RP2) in advance, for example a period of time in advance such as 1 s in advance. However, it may not be possible for the device 10 to estimate the second zone well enough in the period of time such as 1 s in advance. Therefore, the device 10 may additionally and/or alternatively start sensing resources (i.e., transmission resource pools) of a plurality of candidate zones in advance, for example a period of time in advance such as 1 s in advance. For example, the device 10 may start sensing the resources of 2, 3 or more candidate zones in advance. Furthermore, the device 10 may stop sensing the resource of 1 or more of the candidate zones if the device 10 determines that these candidate zones are not relevant, for example, if the device 10 is not moving towards these candidate zones such that these candidate zones will not be the second zone. If the device 10 is not able to estimate the second zone well enough in the period of time such as 1 s in advance, the device 10 may instead use an exceptional pool when the device 10 is out of coverage. The device 10 may be pre-configured to use the exceptional pool in this scenario.

Table 2 summarizes these scenarios for an example practical application, in which four approaches described herein are compared:

Approach A: Allow an UE to continue using a first resource pool txPool1 (i.e., RP1) until sensing is completed for a second resource pool txPool2 (i.e., RP2). That is, the UE switches upon having sensed txPool2 (i.e., RP2) for long enough.

Approach B: Require the UE to temporarily employ another pool, that the UE starts sensing before the UE is (re-) configured to use the third resource pool txPool2 (i.e., RP3). For example, the UE may start sensing a source exceptional pool, or a dedicated fallback pool txPoolFB (i.e., RP2) before HO, or continuously. That is, the UE switches to txPoolFB (i.e., RP2) at a time to start using the target pool txPool2 (i.e., RP3) if txPool2 (i.e., RP3) has not been sensed long enough. Switch to txPool2 (i.e., RP3) upon having sensed txPool2 (i.e., RP3) long enough.

Approach C: Require the UE to start sensing the second resource pool txPool2 (i.e., RP2) in advance of the UE being (re-) configured to use the second resource pool txPool2 (i.e., RP2) (i.e., pre-sense a target pool). For example, the UE switches upon a command or detecting zone or pool change.

Approach D: Pre-sense fallback/intermediate pool txPoolFB (i.e., RP2) and use txPoolFB (i.e., RP2) while target pool txPool2 (i.e., RP3) has not been sensed long enough. Switch to txPoolFB (i.e., RP2) at time to start use target pool txPool2 (i.e., RP3) if that pool has not been sensed long enough. Use random selection for txPoolFB (i.e., RP2) while txPoolFB (i.e., RP2) has not been sensed long enough to use sensing based selection (i.e., pre-sensing was too short). Switch to txPool2 (i.e., RP3) upon having sensed txPool2 (i.e., RP3) long enough.

TABLE 2

| Scenario | Description | Approach A: continue using first resource pool txPool1 | Approach B: temporarily use pre-sensed second resource pool txPoolFB | Approach C: pre-sense second resource pool txPool2 | Approach D: Pre-sense second resource pool txPoolFB and use txPoolFB while target pool txPool2 has not been sensed long enough |
|---|---|---|---|---|---|
| 1 | Upon HO, for target cell UE is configured with network scheduled transmission resources and exceptional pool for use while T304 is running | If UE is configured with Mode 2 resources: UE continues using source cell transmission pool during T304 | If UE is configured with Mode 1 resources: UE starts sensing source cell exceptional transmission pool early so it can be used during T304. Note 1 | Not applicable | Upon HO exceptional pool of target cell may be configured, that UE temporarily uses, initially with random resource selection. As HO should complete before sensing, UE will normally only apply random selection |
| 2 | Upon HO, for target cell UE is configured with pool of UE autonomously selectable transmission resources | If UE is configured with Mode 2 resources: UE continues using source cell transmission pool until UE is ready to transmit via target cell transmission pool (i.e., sensing completed) | UE starts sensing source cell exceptional transmission pool early so it can be used until it is ready to transmit via target cell transmission pool (i.e., sensing completed). Note 1 | Solution requires UE to know txPool2 details, i.e., transmission resources used in target cell. UE might start sensing txPool2, e.g., from the moment it starts TTT for the HO related measurement event. | Same as scenario 1. As UE cannot start sensing of temporary pool earlier than target pool, UE will only apply random selection in this scenario (upon sensing long enough UE switches to target pool) |
| 3 | Change of geographical zone (with Mode 2 Tx resources), i.e., while staying within cell | UE continues using source zone Tx pool until it is ready to transmit via target zone Tx pool (i.e., sensing completed) | UE starts sensing source cell fallback transmission pool early so it can be used until it is ready to transmit via target cell transmission pool (i.e., sensing completed). Note 1 | It is assumed the UE knows txPool2 details, i.e., transmission resources used in the target zone (as long as cell does not change). UE might start sensing txPool2 when distance to zone border is below some limit | If UE did not start pre-sensing target pool of target zone long enough in advance, UE will use source cell fallback transmission pool. If that fallback pool has not yet been sensed long enough, random selection is used (and otherwise sensing based resource selection) |
| 4a | Upon connection establishment, UE is configured with network scheduled transmission resources | If normal transmission pool is configured for idle Mode (SIB18), UE continues using this pool during T300. Note 2 | If only exceptional transmission pool is configured (SIB18), UE could sense exceptional Tx pool continuously so it can be used during | Not applicable | During connection establishment, UE employs exceptional pool. If that fallback pool has not yet been sensed long enough (e.g., power on), random |

TABLE 2-continued

| Scenario | Description | Approach A: continue using first resource pool txPool1 | Approach B: temporarily use pre-sensed second resource pool txPoolFB | Approach C: pre-sense second resource pool txPool2 | Approach D: Pre-sense second resource pool txPoolFB and use txPoolFB while target pool txPool2 has not been sensed long enough |
|---|---|---|---|---|---|
| | | | T300. Note 1 | | selection is used (and otherwise sensing based resource selection) |
| 4b | Upon connection establishment, UE is configured with dedicated pool of UE autonomously selectable transmission resources | If normal transmission pool is configured for idle Mode (SIB18), UE continues using this pool until it is ready to transmit via dedicated transmission pool (i.e., sensing completed) | If only exceptional transmission pool is configured (SIB18), UE could sense exceptional transmission pool continuously so it can be used until it is ready to transmit via dedicated transmission pool (i.e., sensing completed). Note 1, Note 2 | Not applicable, i.e., may not be possible to predict connection establishment | Same as for scenario 4a. |

Note 1: Instead of starting sensing before a particular event (e.g., radio quality going down, so HO or RLF may occur), UE may continuously monitor the fallback/exceptional transmission pool so that the UE may use this during any sudden unforeseen event (connection establishment is difficult to predict). Such an approach may drain UE batteries, but power saving options could be left to UE implementation.

Note 2: Exceptional pool may only be intended to be used as fallback pool when using Mode 1 resources.

Table 3 summarizes time periods during which device is configured, for example allowed, permitted and/or required, to use an exceptional pool (i.e., a temporary pool). The device may be configured to stop using the exceptional pool upon completing sensing of a target pool for a required duration, as described previously.

TABLE 3

| | From | Until (scheduled resources in target state) | Until (UE selected resources in target state) |
|---|---|---|---|
| Establishment | Initiation of connection establishment | Switch to network scheduled resource (end usage of exceptional pool as today) | Sensing completed for newly received UE selected resources |
| Reconfiguration | Receipt of reconfiguration message | N/A | Sensing completed for newly received UE selected resources |
| RLF with re-establish | Detection of RLF | Switch to network scheduled resource upon reconfiguration following re-establishment (end usage of exceptional pool as today) | Sensing completed for newly received UE selected resources |

TABLE 3-continued

| | From | Until (scheduled resources in target state) | Until (UE selected resources in target state) |
|---|---|---|---|
| Release/ RLF resulting in idle | Receipt of release message/ Detection of RLF | N/A | Sensing completed for broadcasted UE selected resources |
| HO | Receipt of handover message/start T304 | Switch to network scheduled resource (end usage of exceptional pool as today) | Sensing completed for newly received UE selected resources |
| Cell reselection | Unspecified | Unspecified | Unspecified |

As a summary regarding use by the device of an exceptional pool:

1) Following RLF, the device may be required to use sensing for the exceptional pool, as described previously;
2) Use of exceptional transmission resources upon HO for a case in which the device is configured with scheduled resources, for example by a target cell, may be allowed only during T304. For a case in which the device is configured with a pool, the exceptional resources may be used, for example with random selection, until the device has sensed the pool for long enough, as described previously. However, in case of a subsequent pool reconfiguration, the device may not use the exceptional pool included in the HO command, but rather, should use a pool in SIB21;
3) During connection establishment, the device uses either a normal transmission pool or, if that is not included in SIB21, an exceptional pool. For both the normal transmission pool and the exceptional pool, sensing is used. However, if the device has not performed sensing for long enough as described previously, the device should use the exceptional pool with random selection, as described previously; and
4) In case of release, the device should use the transmission resources in SIB21. If sensing has not been completed, the device should use exceptional pool with random selection, as described previously.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the operations of any method or process so disclosed, may be combined in any combination, except combinations where at least some of such features and/or operations are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for switching resource pools by a device in a wireless communication system, the method comprising:
receiving, from a base station, system information block (SIB) including first vehicle-to-everything (V2X) configuration information associated with normal resource pools and second V2X configuration information associated with exceptional resource pools, wherein the first V2X configuration information and the second V2X configuration information indicate resources for a sidelink communication;
sensing the normal resource pools indicated by the first V2X configuration information included in the SIB;
determining whether a result of the sensing the normal resource pools is available;
selecting one of the normal resource pools indicated by the first V2X configuration information in case that the result of the sensing the normal resource pools is available;
selecting, by using random selection, one of the exceptional resource pools indicated by the second V2X configuration information included in the SIB in case that the device is in idle mode and the result of the sensing the normal resource pools is not available; and transmitting sidelink control information and data based on a resource of the selected resource pool,
wherein the first V2X configuration information is different from the second V2X configuration information.

2. The method of claim 1, further comprising:
determining an expected cell change; and
starting sensing of the normal resource pools based on the determining the expected cell change.

3. The method of claim 1, further comprising:
determining a cell change; and
switching to the normal resource pools based on the result of the sensing the normal resource pools and the determining the cell change.

4. The method of claim 1, further comprising:
determining an expected zone change; and
starting sensing of the normal resource pools based on the determining the expected zone change.

5. The method of claim 1, further comprising:
determining a zone change; and
switching to the normal resource pools based on the result of the sensing the normal resource pools and the determining the zone change.

6. The method of claim 1, further comprising:
receiving a command; and
starting sensing of the normal resource pools based on the received command.

7. The method of claim 1, further comprising:
determining a state transition of the device; and
starting sensing of the normal resource pools based on the determining the state transition.

8. The method of claim 1, wherein the sensing is according to scheduling assignment (SA) decoding.

9. The method of claim 1, wherein the sensing is according to energy measurement.

10. The method of claim 1, further comprising pre-sensing a reception resource pool.

11. The method of claim 1, further comprising:
receiving a bit indicating that a resource pools continues across a cell border.

12. The method of claim 1, further comprising:
pre-sensing a second resource pools based on a Time to Trigger (TTT) or a Treselection timer.

13. A device for switching resource pools in a wireless communication system, the device comprising:
a transceiver; and
a controller coupled with the transceiver and configured to control to:
receive, from a base station, system information block (SIB) including first vehicle-to-everything (V2X) configuration information associated with normal resource pools and second V2X configuration information associated with exceptional resource pools, wherein the first V2X configuration information and the second V2X configuration information indicate resources for a sidelink communication,
sense the normal resource pools indicated by the first V2X configuration information included in the SIB,
determine whether a result of the sensing the normal resource pools is available,
select one of the normal resource pools indicated by the first V2X configuration information in case that the result of the sensing the normal resource pools is available,
select, by using random selection, one of the exceptional resource pools indicated by the second V2X configuration information included in the SIB, in case that the device is in idle mode and the result of the sensing the normal resource pools is not available, and
transmit sidelink control information and a data based on a resource of the selected resource pool, wherein the first V2X configuration information is different from the second V2X configuration information.

14. The device of claim 13, wherein the controller is configured to:
determine an expected cell change; and
start sensing the normal resource pools based on the determined expected cell change.

15. The device of claim 13, wherein the controller is configured to:
determine an expected zone change; and
start sensing the normal resource pools based on the determined expected zone change.

16. The device of claim 13, wherein the controller is configured to:
receive a command; and
start sensing the normal resource pools based on the received command.

* * * * *